US006957317B2

(12) United States Patent
Chen et al.

(10) Patent No.: US 6,957,317 B2
(45) Date of Patent: Oct. 18, 2005

(54) APPARATUS AND METHOD FOR FACILITATING MEMORY DATA ACCESS WITH GENERIC READ/WRITE PATTERNS

(75) Inventors: Yen-Kuang Chen, Sunnyvale, CA (US); Eric Debes, Santa Clara, CA (US); Matthew J. Holliman, Sunnyvale, CA (US); Minerva M. Yeung, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 305 days.

(21) Appl. No.: 10/268,186

(22) Filed: Oct. 10, 2002

(65) Prior Publication Data

US 2004/0073771 A1 Apr. 15, 2004

(51) Int. Cl.[7] ................................................ G06F 12/00
(52) U.S. Cl. ....................... 711/218; 711/118; 711/137
(58) Field of Search .............................. 711/118, 137, 711/141–143, 213–215, 218

(56) References Cited

U.S. PATENT DOCUMENTS

| | | | | |
|---|---|---|---|---|
| 5,459,852 A | * | 10/1995 | Nakagawa et al. | 711/138 |
| 5,787,267 A | * | 7/1998 | Leung et al. | 711/105 |
| 6,240,484 B1 | * | 5/2001 | Witt | 711/3 |
| 6,415,356 B1 | * | 7/2002 | Chaudhry et al. | 711/118 |
| 6,539,458 B2 | * | 3/2003 | Holmberg | 711/137 |
| 6,674,443 B1 | * | 1/2004 | Chowdhuri et al. | 345/557 |
| 6,760,818 B2 | * | 7/2004 | van de Waerdt | 711/137 |
| 2002/0088600 A1 | * | 7/2002 | Beeck et al. | 164/137 |

OTHER PUBLICATIONS

El-Mahdy, A. et al., "A Two Dimensional Vector Architecture for Multimedia", EURO-PAR 2001 Parallel Proc., 7th Int'l Euro-Par Conf. Proc., Lecture Notes in Comp. Sci., vol. 2150, Aug. 28, 2001, pp. 687–696.

Corbal, J. et al., "MOM, a Matrix SIMD Instruction Set Architecture for Multimedia Applications", Proc. of the ACM/IEEE, New York, 1999, pp. 1–12.

Thakkar, S., et al. "The Internet Streaming SIMD Extensions", Intel Tech. Journal, vol. 2, May 17, 1999, pp. 1–8.

Cucchiara, R., et al., ExploitingCache in Multimedia, IEEE, Jun. 7, 1999, pp. 345–350.

Ferretti, M., Multi-media Extensions in Super-pipelined Micro-architectures. A new case for SIMD processing? IEEE, Sep. 11, 2000, pp. 249–258.

Co-pending PCT Appl. No. PCT/US03/30578, Int'l Search Report, mailed Dec. 30, 2004.

* cited by examiner

*Primary Examiner*—Nasser Moazzami
(74) *Attorney, Agent, or Firm*—Blakely, Sokoloff, Taylor and Zafman

(57) ABSTRACT

An apparatus and method facilitating memory data access with generic read/write patterns are described. In one embodiment, the method includes the detection, in response to a load instruction, of a cache hit/cache miss of data requested by the load instruction within a re-tiling (RT) cache. When a cache miss is detected, a block of data is loaded into the RT cache according to the load instruction. This block of data will contain the data requested by the load instruction. Once loaded, a non-horizontally sequential access of the data requested by the load instruction is performed from the RT cache. Finally, the data accessed from the RT cache may be stored into a destination data storage device according to the load instruction.

33 Claims, 19 Drawing Sheets

FUNDAMENTAL 128-BIT PACKED SIMD DATA TYPES

128-BIT PACKED FLOATING-POINT AND INTEGER DATA TYPES

CONVENTIONAL RASTER SCAN MEMORY ARRANGEMENT 300

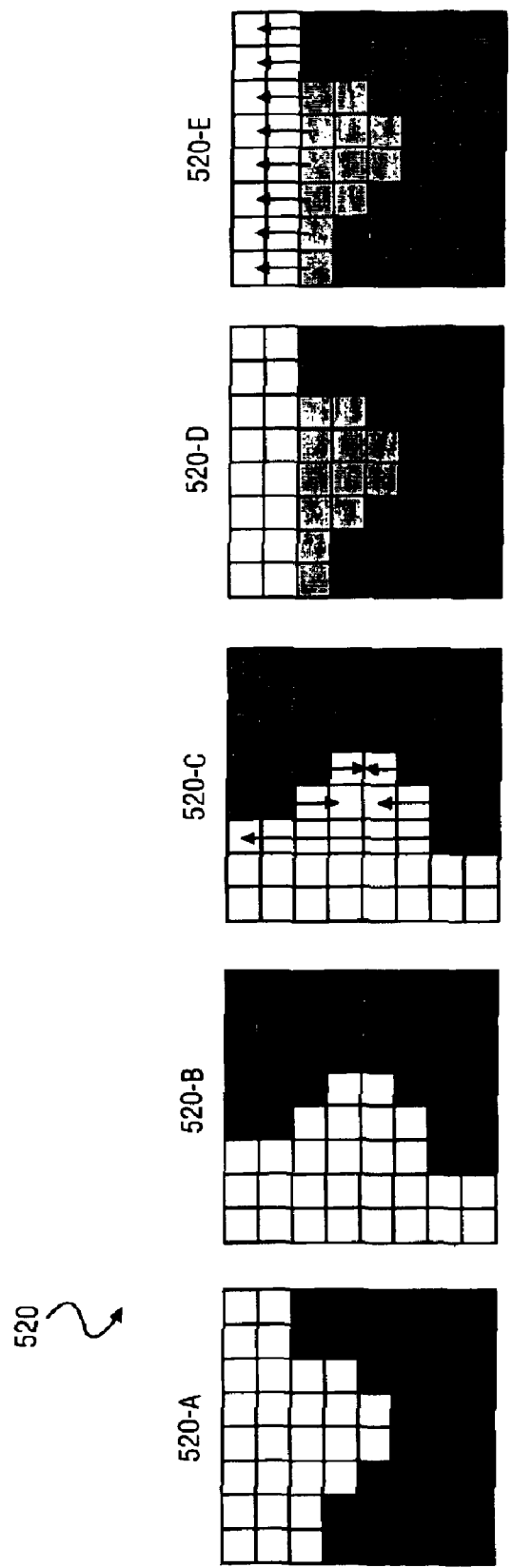

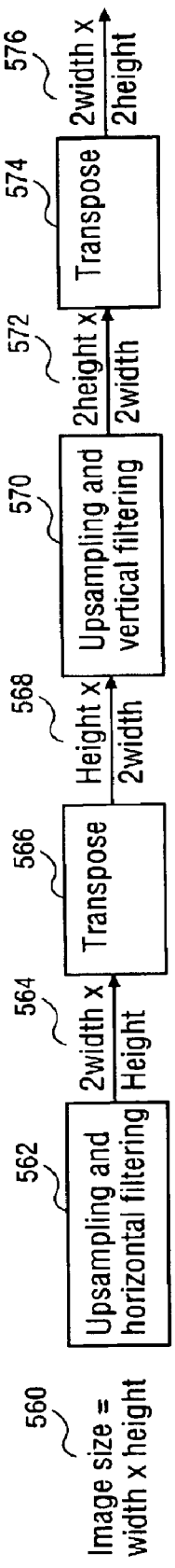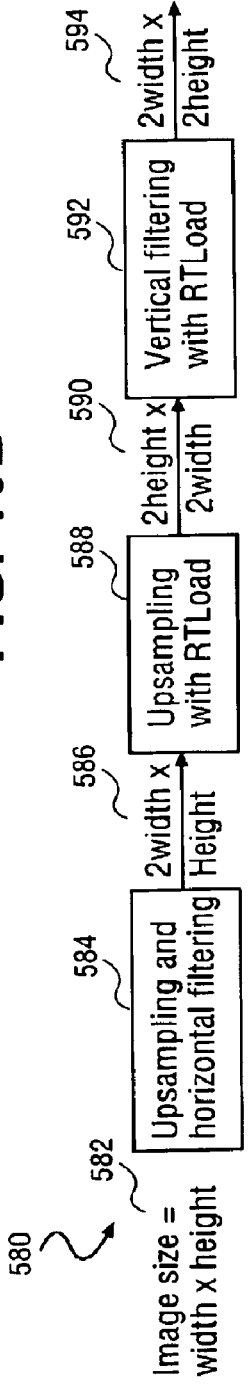

APPARATUS AND METHOD FOR FACILITATING MEMORY DATA ACCESS WITH GENERIC READ/WRITE PATTERNS

FIELD OF THE INVENTION

The invention relates generally to the field of memory access. More particularly, the invention relates to a method and apparatus for facilitating memory data access with generic and contiguous read/write patterns.

BACKGROUND OF THE INVENTION

Media applications have been driving microprocessor development for more than a decade. In fact, future media applications will place even higher computational requirements on available microprocessors. As a result, tomorrow's personal computing (PC) experiences will be even richer in audio/video effects as well as being easier to use. More importantly, future microprocessors will enable computing to merge with communications.

Accordingly, the display of images has become increasingly popular for current, as well as future, computing devices. Unfortunately, the quantity of data required for these types of media applications tends to be very large. In addition, increases in computational power, memory and disk storage, as well as network bandwidth, have facilitated the creation and use of larger and higher quality images. However, the use of larger and higher quality images often results in a bottleneck between the processor and memory. As such, image/video processing (media) applications often suffer from memory latency problems in spite of the fact that microprocessor clock speeds are continuously increasing.

Although Random Access Memory (RAM) claims to provide random access to the memory contained therein, RAM is not generally accessible in a random pattern. In fact, the time required to access different portions of the RAM may vary. For example, horizontal access of memory locations within a memory device is generally quite expedient. In contrast, vertical memory access is quite slow when utilizing conventional memory devices.

As a result, raster-scan memory arrangements for video images place pixel data linearly across the image plane within a cache memory, which often lead to numerous problems. First, a cache line holds some parts of several basic image blocks (e.g., 8×8 or 16×16). In contrast, a basic image block is contained in several cache lines. As such, accessing a block, say 8×8, is equivalent to accessing several cache lines (e.g. at least 8 cache lines in current architectures under the assumption that we are dealing with images wider than a single cache line).

Accessing an image using conventional memory devices requires at least eight memory accesses. Furthermore, it is likely that eight software pre-caching instructions are required in order to avoid having eight cache misses. Moreover, when processing an image block, conventional applications load superfluous data into the cache in addition to the block itself. Consequently, unless we process nearby blocks immediately, superfluous data will be brought into the cache memory, which reduces the cache efficiency due to the superfluous data.

One solution for providing improved cache localities when processing image data involves block based memory arrangements. Although block based memory arrangement schemes provides higher cache localities, access to a vertical set of 8- or 16-pixels using one instruction is still not supported. To access a vertical set of data, most conventional implementations use pack and unpack operations to transpose the data. Unfortunately, this is a slow procedure in most of the applications. Moreover, in some applications, such as image/video compression, the pixel data must be accessed in varying scan orders, which is nearly a random access of the pixel data. Therefore, there remains a need to overcome one or more of the limitations in the above-described, existing art.

BRIEF DESCRIPTION OF THE DRAWINGS

The various embodiments of the present invention are illustrated by way of example, and not by way of limitation, in the figures of the accompanying drawings and in which:

FIGS. 9A–9E depict block diagrams illustrating transposing and padding of pixel data of an image in accordance with the conventional pixel padding procedure, as depicted in FIG. 8A.

FIG. 10A depicts a block diagram illustrating an image utilized for image filtering, as illustrated in FIGS. 10B and 10C.

FIG. 10B depicts a method for image filtering with separable filters as known in the art.

FIG. 10C depicts a flowchart illustrating a method for performing image filtering with separable filters utilizing an RT load operation, in accordance with an exemplary embodiment of the present invention.

DETAILED DESCRIPTION

Figure 1:
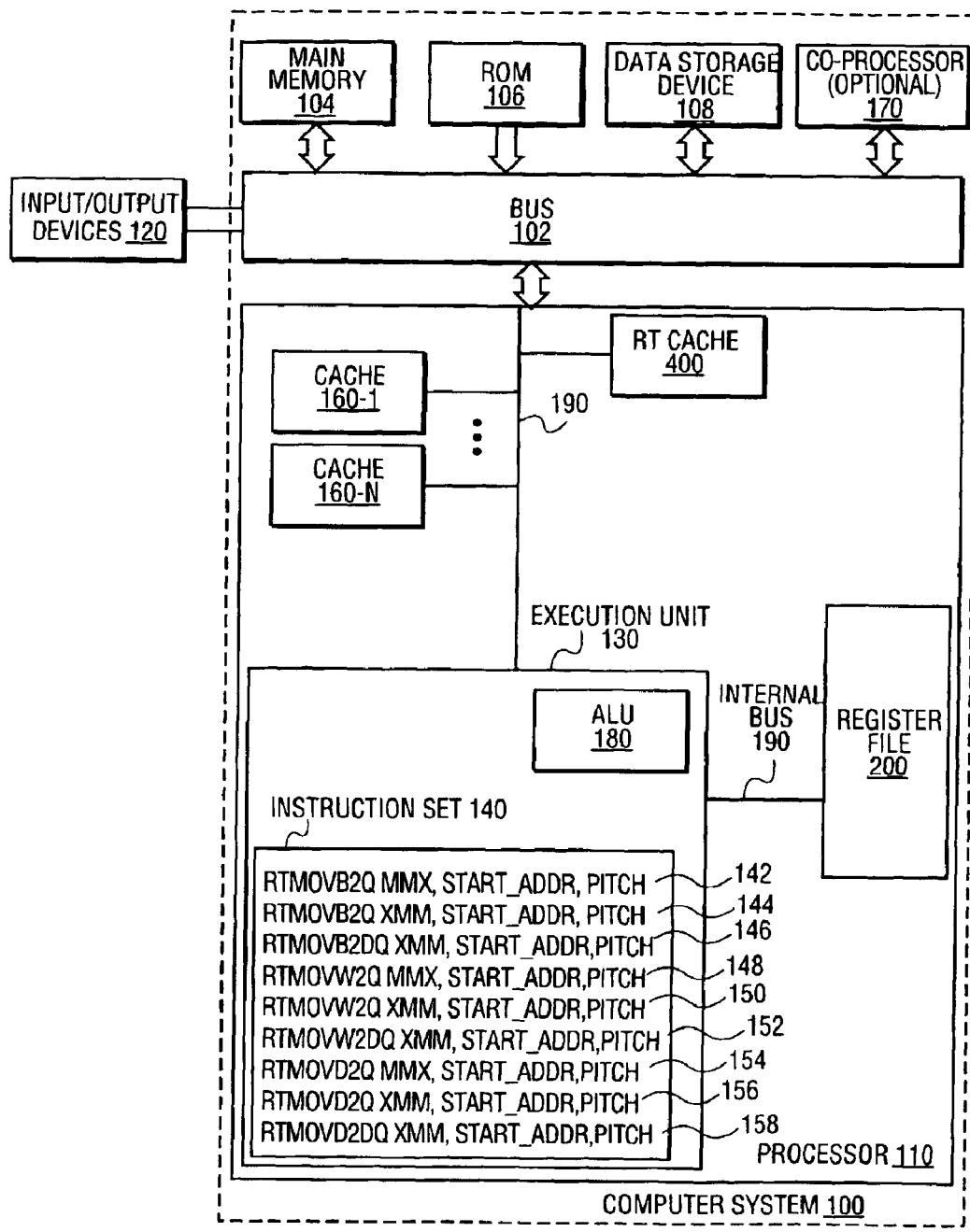
FIG. 1 depicts a block diagram illustrating a computer system implementing a re-tiling (RT) cache memory in accordance with one embodiment of the present invention.

A method and apparatus for facilitating memory data access with generic read/write patterns are described. In one embodiment, the method includes the detection, in response to a memory-access instruction, of a cache hit/cache miss of data requested by the memory-access instruction, within a re-tiling (RT) cache. When a cache miss is detected, a block of data is loaded within the RT cache according to the load instruction. This block of data will contain the data requested by the memory-access instruction. Once loaded, a non-horizontally sequential access of the data requested by the memory-access instruction is performed from the RT cache. Finally, the data accessed from the RT cache may be stored within a destination data storage device according to the memory-access instruction.

In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the embodiments of the present invention. In other instances, well-known structures and devices are shown in block diagram form in order to avoid obscuring the details of the present invention.

Portions of the following detailed description may be presented in terms of algorithms and symbolic representations of operations on data bits. These algorithmic descriptions and representations are used by those skilled in the data processing arts to convey the substance of their work to others skilled in the art. An algorithm, as described herein, refers to a self-consistent sequence of acts leading to a desired result. The acts are those requiring physical manipulations of physical quantities. These quantities may take the form of electrical or magnetic signals capable of being stored, transferred, combined, compared, and otherwise manipulated. Moreover, principally for reasons of common usage, these signals are referred to as bits, values, elements, symbols, characters, terms, numbers, or the like.

However, these and similar terms are to be associated with the appropriate physical quantities and are merely convenient labels applied to these quantities. Unless specifically stated otherwise, it is appreciated that discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's devices into other data similarly represented as physical quantities within the computer system devices such as memories, registers or other such information storage, transmission, display devices, or the like.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software.

One of skill in the art will immediately appreciate that the invention can be practiced with computer system configurations other than those described below, including hand-held devices, multiprocessor systems, microprocessor-based or programmable consumer electronics, digital signal processing (DSP) devices, network PCs, minicomputers, mainframe computers, and the like. The invention can also be practiced in distributed computing environments where tasks are performed by remote processing devices that are linked through a communications network. The required structure for a variety of these systems will appear from the description below.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

In an embodiment, the methods of the present invention are embodied in machine-executable instructions. The instructions can be used to cause a general-purpose or special-purpose processor that is programmed with the instructions to perform the methods of the present invention. Alternatively, the methods of the present invention might be performed by specific hardware components that contain hardwired logic for performing the methods, or by any combination of programmed computer components and custom hardware components.

In one embodiment, the present invention may be provided as a computer program product which may include a machine or computer-readable medium having stored thereon instructions which may be used to program a computer (or other electronic devices) to perform a process according to the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

Accordingly, the computer-readable medium includes any type of media/machine-readable medium suitable for storing electronic instructions. Moreover, the embodiments of the present invention may also be downloaded as a computer program product. As such, the program may be transferred from a remote computer (e.g., a server) to a requesting computer (e.g., a client). The transfer of the program may be by way of data signals embodied in a carrier wave or other propagation medium via a communication link (e.g., a modem, network connection or the like).

Computing Architecture

FIG. 1 shows a computer system 100 upon which one embodiment of the present invention can be implemented. Computer system 100 comprises a bus 102 for communicating information, and processor 110 coupled to bus 102 for processing information. The computer system 100 also includes a memory subsystem 104–108 coupled to bus 102 for storing information and instructions for processor 110. Processor 110 includes an execution unit 130 containing an arithmetic logic unit (ALU) 180, a register file 200, one or more cache memories 160 (160-1, . . . , 160-N), a re-tiling (RT) cache memory 400, and an internal bus 190.

High speed, temporary memory buffers (cache) 160 are coupled to execution unit 130 and store frequently and/or recently used information for processor 110. As described herein, memory buffers 160 include but are not limited to cache memories, solid state memories, RAM, synchronous RAM (SRAM), synchronous data RAM (SDRAM) or any device capable of supporting high speed buffering of data. Accordingly, high speed, temporary memory buffers 160 are referred to interchangeably as cache memories 160 or one or more second memory buffers.

In addition, it should be noted that in an alternative embodiment, the term second memory buffer refers to the main (external) memory 104. However, in contrast to conventional cache memories, the system 100 includes an RT cache memory 400. As described in further detail below, the RT cache 400 supports non-horizontally sequential memory access of data contained therein by processor 110. Register file 200 stores information in processor 110 and is coupled to execution unit 130 via internal bus 190.

In one embodiment of the invention, register file 200 includes multimedia registers, for example, SIMD (single instruction, multiple data) registers for storing multimedia information. In one embodiment, multimedia registers each store at least sixty-four bits of packed data. Multimedia registers may be dedicated multimedia registers or registers which are used for storing multimedia information and other information. In one embodiment, multimedia registers store multimedia data when performing multimedia operations and store floating point data when performing floating point operations.

In one embodiment, execution unit 130 operates on image data according to the instructions received by processor 110 that are included in instruction set 140. Execution unit 130 also operates on packed, floating-point and scalar data according to instructions implemented in general-purpose processors. Processor 110 is capable of supporting the Pentium® microprocessor instruction set as well as packed instructions, which operate on packed data. By including a packed instruction set in a standard microprocessor instruction set, such as the Pentium® microprocessor instruction set, packed data instructions can be easily incorporated into existing software (previously written for the standard microprocessor instruction set). Other standard instruction sets, such as the PowerPC™ and the Alpha™ processor instruction sets may also be used in accordance with the described invention. (Pentium® is a registered trademark of Intel Corporation. PowerPC™ is a trademark of IBM, APPLE COMPUTER and MOTOROLA. Alpha™ is a trademark of Digital Equipment Corporation.)

A plurality of RT move (RTMOV) instructions, which are collectively referred to herein as RT load operations or instructions are provided according to one embodiment of the invention. In addition, in embodiments described, the RT load, as well as RTMOV, instructions may be referred as memory-access instructions. In one embodiment, the memory-access instruction includes RT write and RT read operations. Accordingly, as illustrated in FIG. 1, the instruction set includes RT move operations supporting byte data (instructions 142–146), word data (instructions 148–152) and doubleword data (instructions 154–158). In an alternative embodiment, the instruction set includes RT move prefetch operations. The prefetch operations pre-load data into the RT cache according to the instructions in order to anticipate requested data. Utilizing these operations, current image processing techniques may be improved by avoiding costly transpose operations of image data, as well as avoiding cache locality issues, as well as cache overload issues, with superfluous data.

Figure 2:
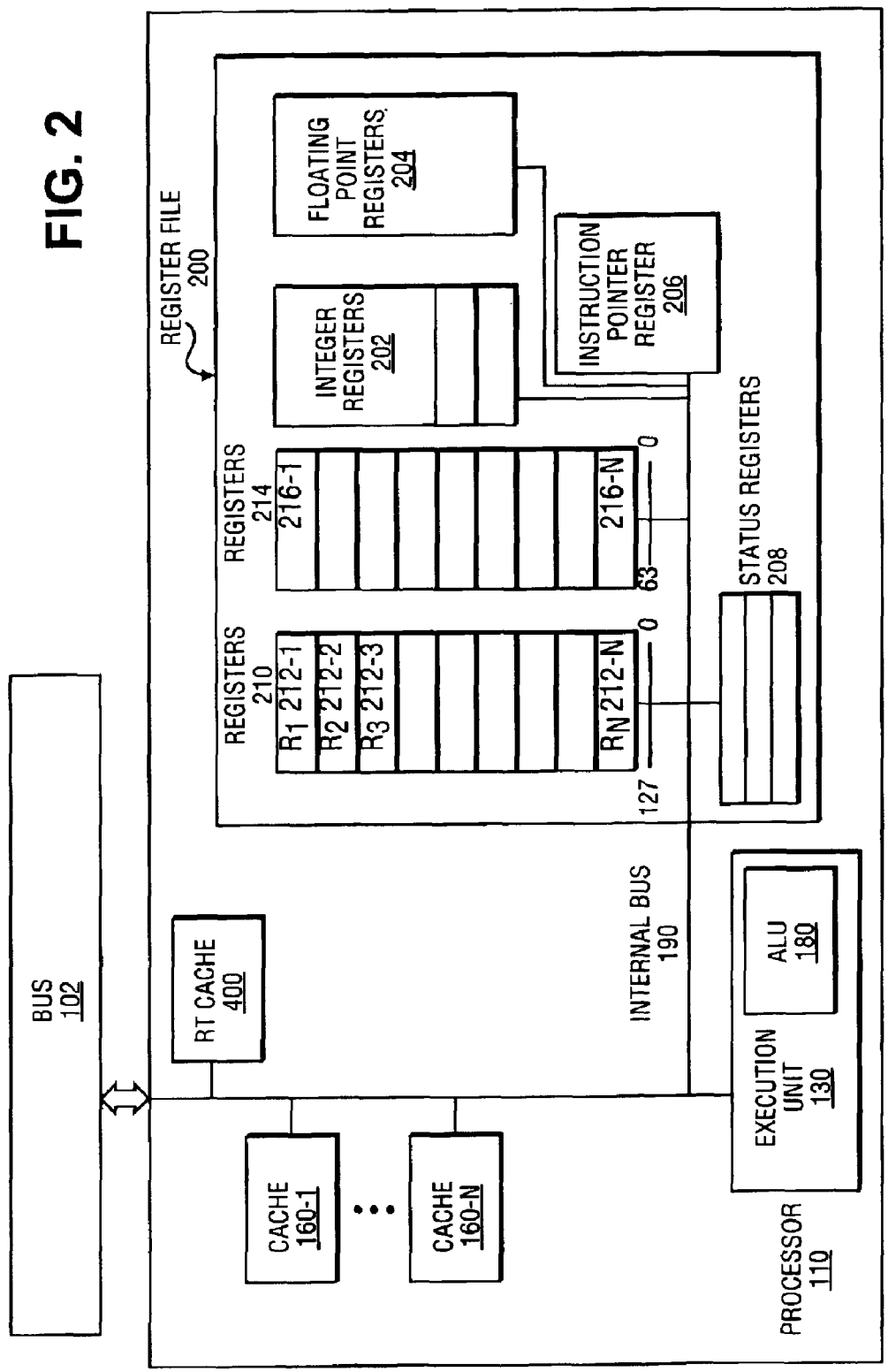
FIG. 2 depicts a block diagram further illustrating the processor as depicted in FIG. 1 in accordance with a further embodiment of the present invention.

The parameters MMX and XMM in the embodiments described refer to 64-bit registers, for example, registers 214 as depicted in FIG. 2, and 128-bit registers, such as registers 210 as depicted in FIG. 2. The START_ADDR parameter refers to a start address within an image block, while the pitch parameter refers to an image block, which in one embodiment is 8 bytes. As will be described in further detail below, the RTMOV operations, which are collectively referred to as RT load operations, enable non-horizontally sequential memory access of data within the RT cache 400. As described herein, non-horizontally sequential memory access includes, but is not limited to, both sequential and non-sequential vertical memory access, and non-sequential, horizontal memory access.

By including the instruction set 140 in the instruction set of the general-purpose processor 10, along with associated circuitry to execute the instructions, the operations used by many existing multimedia applications may more efficiently perform image processing using a general-purpose processor. Thus, many multimedia applications may be accelerated and executed more efficiently by utilizing a single instruction to perform a non-horizontally sequential access of an image block. In addition, packed instructions enable using the full width of a processor's data bus for performing operations on packed data. This eliminates the need to transfer smaller units of data across the processor's data bus to perform one or more operations one data element at a time.

Still referring to FIG. 1, the computer system 100 of the present invention may include one or more I/O (input/output) devices 120, including a display device such as a monitor. The I/O devices 120 may also include an input device such as a keyboard, and a cursor control such as a mouse, trackball, or trackpad. In addition, the I/O devices may also include a network connector such that computer system 100 is part of a local area network (LAN) or a wide area network (WAN), the I/O devices 120, a device for sound recording, and/or playback, such as an audio digitizer coupled to a microphone for recording voice input for speech recognition. The I/O devices 120 may also include a video digitizing device that can be used to capture video images, a hard copy device such as a printer, and a CD-ROM device.

Processor

FIG. 2 illustrates a detailed diagram of processor 110. Processor 110 can be implemented on one or more substrates using any of a number of process technologies, such as, BiCMOS, CMOS, and NMOS. Data can then be stored in register file 200 via internal bus 190. As a matter of clarity, the registers of an embodiment should not be limited in meaning to a particular type of circuit. Rather, a register of an embodiment need only be capable of storing and providing data, and performing the functions described herein.

Depending on the type of data, the data may be stored in integer registers 202, registers 210, registers 214, status registers 208, or instruction pointer register 206. Other registers can be included in the register file 200, for example, floating point registers 204. In one embodiment, integer registers 202 store thirty-two bit integer data. In one embodiment, registers 210 contains eight multimedia registers (XMM), $R_1$ 212-1 through $R_8$ 212-8, for example, single instruction, multiple data (SIMD) registers containing packed data. Each register in registers 210 is one hundred twenty-eight bits in length. R1 212a, R2 212b and R3 212c are examples of individual registers in registers 209.

In one embodiment, registers 214 contains eight multimedia registers (MMX), 216-1 through 216-8, for example, single instruction, multiple data (SIMD) registers containing packed data. Each register in registers 214 is sixty-four bits in length. Status registers 208 indicate the status of processor 110. Instruction pointer register 206 stores the address of the next instruction to be executed. Integer registers 202, status registers 208, registers 210, registers 214, floating-point registers 204 and instruction pointer register 206 all connect to internal bus 190. Any additional registers would also connect to the internal bus 190.

In another embodiment, some of these registers can be used for different types of data. For example, registers 210/214 and integer registers 202 can be combined where each register can store either integer data or packed data. In another embodiment, registers 210/214 can be used as floating point registers. In this embodiment, packed data or floating point data can be stored in registers 210/214. In one embodiment, the combined registers are one hundred ninety-two bits in length and integers are represented as one hundred ninety-two bits. In this embodiment, the registers do not need to differentiate between the two data types when storing packed data and integer data.

Execution unit 130, in conjunction with, for example ALU 180, perform the operations carried out by processor 110. Such operations may include shifts, addition, subtraction and multiplication, etc. Execution unit 130 is connected to and communicates with the various components of processor 110 via internal bus 190. As described above, the processor includes the first memory buffer (RT cache) 400 as well as the one or more second memory buffers (cache) 160. The RT cache 400 as well as the one or more cache memories 160 can be used to buffer data and/or control signals from, for example, main memory 104.

Data and Storage Formats

Figure 3A:
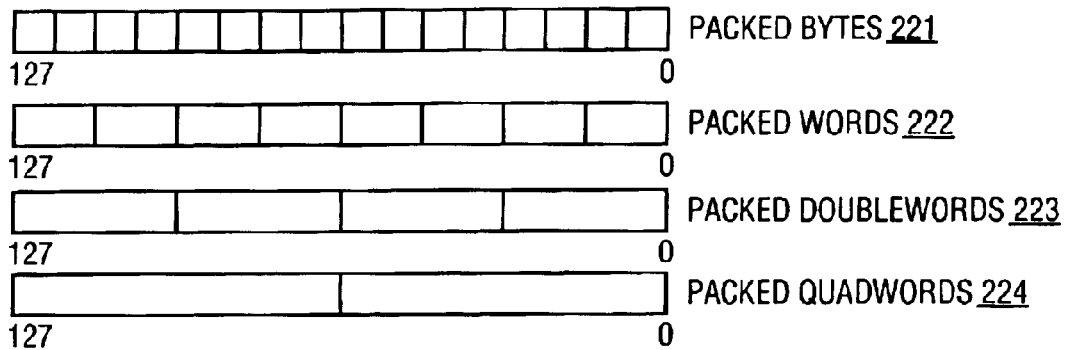
FIGS. 3A and 3B depict block diagrams illustrating 128-bit packed SIMD data types in accordance with one embodiment of the present invention.
Figure 3B:
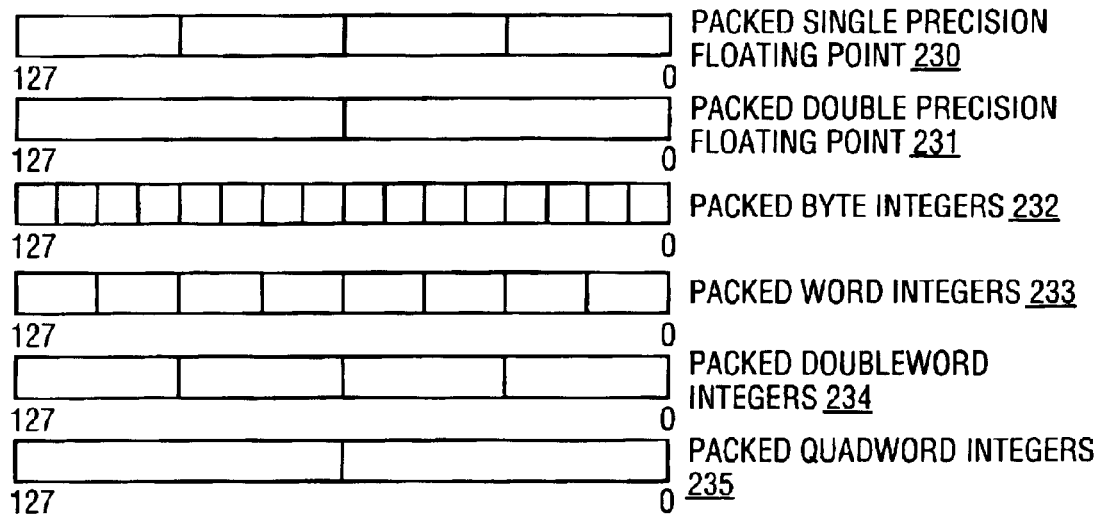

Referring now to FIGS. 3A and 3B, FIGS. 3A and 3B illustrate 128-bit SIMD data type according to one embodiment of the present invention. FIG. 3A illustrates four 128-bit packed data-types: packed byte 221, packed word 222, packed doubleword (dword) 223 and packed quadword 224. Packed byte 221 is one hundred twenty-eight bits long containing sixteen packed byte data elements. Generally, a data element is an individual piece of data that is stored in a single register (or memory location) with other data elements of the same length. In packed data sequences, the number of data elements stored in a register is one hundred twenty-eight bits divided by the length in bits of a data element.

Packed word 222 is one hundred twenty-eight bits long and contains eight packed word data elements. Each packed word contains sixteen bits of information. Packed doubleword 223 is one hundred twenty-eight bits long and contains four packed doubleword data elements. Each packed doubleword data element contains thirty-two bits of information. A packed quadword 224 is one hundred twenty-eight bits long and contains two packed quad-word data elements. Thus, all available bits are used in the register. This storage arrangement increases the storage efficiency of the processor. Moreover, with multiple data elements accessed simultaneously, one operation can now be performed on multiple data elements simultaneously.

FIG. 3B illustrates 128-bit packed floating-point and Integer Data types according to one embodiment of the invention. Packed single precision floating-point 230 illustrates the storage of four 32-bit floating point values in one of the SIMD-XMM registers 210, as shown in FIG. 2. Packed double precision floating-point 231 illustrates the storage of two 64-bit floating-point values in one of the SIMD-XMM registers 210 as depicted in FIG. 2. As will be described in further detail below, packed double precision floating-point 231 may be utilized to store two element vectors of a 2×2 sub-matrix such that the entire sub-matrix may be stored utilizing two 128-bit registers, each containing four vector elements which are stored in packed double precision floating-point format. Packed byte integers 232 illustrate the storage of 16 packed integers, while packed word integers 233 illustrate the storage of 8 packed words. Finally, packed doubleword integers 234 illustrate the storage of four packed doublewords, while packed quadword integers 235 illustrate the storage of two packed quadword integers within a 128-bit register, for example as depicted in FIG. 2.

Figure 3C:
FIGS. 3C and 3D depict block diagrams illustrating 64-bit packed SIMD data types in accordance with a further embodiment of the present invention.
Figure 3D:
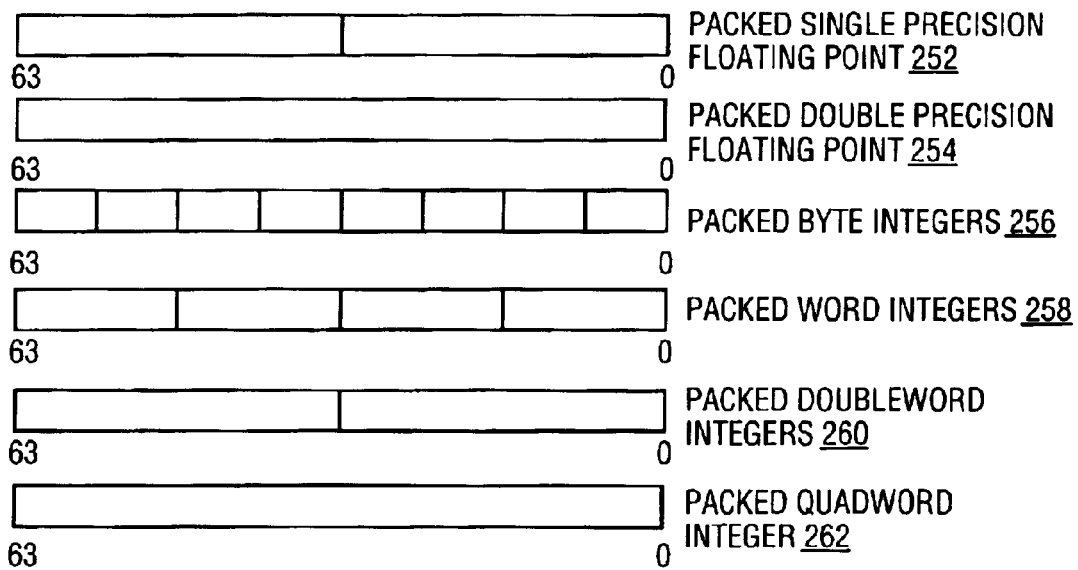

Referring now to FIGS. 3C and 3D, FIGS. 3C and 3D depict blocked diagrams illustrating 64-bit packed SIMD data types in accordance with one embodiment of the present invention. As such, FIG. 3C depicts four 64-bit packed data types: packed byte 242, packed word 244, packed doubleword 246 and packed quadword 248. Packed byte 242 is 64 bits long, containing 8 packed byte data elements. As described above, in packed data sequences, the number of data elements stored in a register is 64 bits divided by the length in bits of a data element. Packed word 244 is 64 bits long and contains 4 packed word elements. Each packed word contains 16 bits of information. Packed doubleword 246 is 64 bits long and contains 2 packed doubleword data elements. Each packed doubleword data element contains 32 bits of information. Finally, packed quadword 248 is 64 bits long and contains exactly one 64-bit packed quadword data element.

Referring now to FIG. 3D, FIG. 3D illustrates 64-bit packed floating-point and integer data types in accordance with a further embodiment of the present invention. Packed single precision floating point 252 illustrates the storage of two 32-bit floating-pint values in one of the SIMD-XMM registers 214 as depicted in FIG. 2. Packed double precision floating-point 254 illustrates the storage of one 64-bit floating point value in one of the SIMD-MMX registers 214 as depicted in FIG. 2. Packed byte integer 256 illustrates the storage of eight 32-bit integer values in one of the SIMD-MMX registers 214 as depicted in FIG. 2. Packed doubleword integer 260 illustrates the storage of two 32-bit integer values in one of the SIMD-MMX registers 214 as depicted in FIG. 2. Finally, packed quadword integer 262 illustrates the storage of a 64-bit integer value in one of the SIMD-MMX registers 214 as depicted in FIG. 2.

Conventional Image Block Processing

Figure 4:
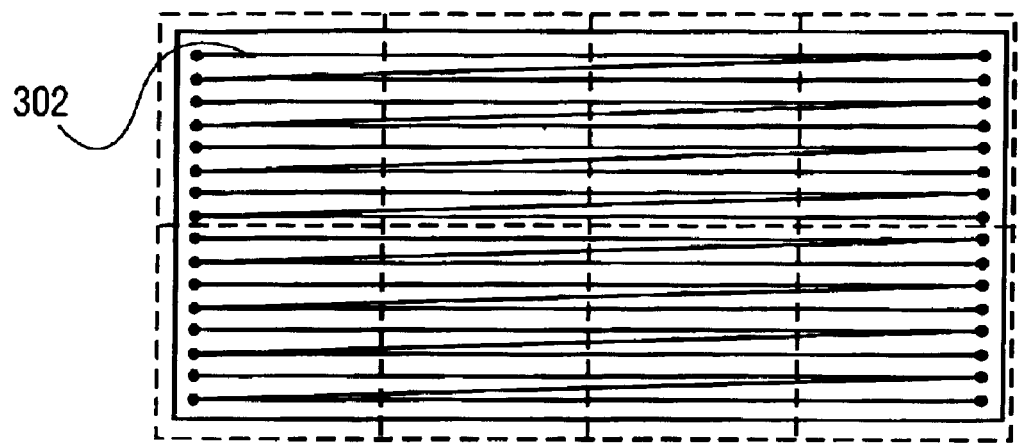
FIG. 4 depicts a block diagram illustrating a conventional raster scan memory arrangement as known in the art.

Current raster-scan memory arrangement 300 for image/video applications place pixel data 302 across image planes in a linear fashion, as depicted in FIG. 4. As a result, in the conventional raster scan memory arrangement 300, a cache line typically holds some parts of several basic image blocks (e.g., 8×8 or 16×16). For example, a cache line could hole one line for four separate basic image blocks. On the other hand, a basic image block is typically contained in multiple cache lines. That is, a single basic block could be contained in, for example, eight separate cache lines.

Non-horizontally Sequential Memory Access

Figure 5:
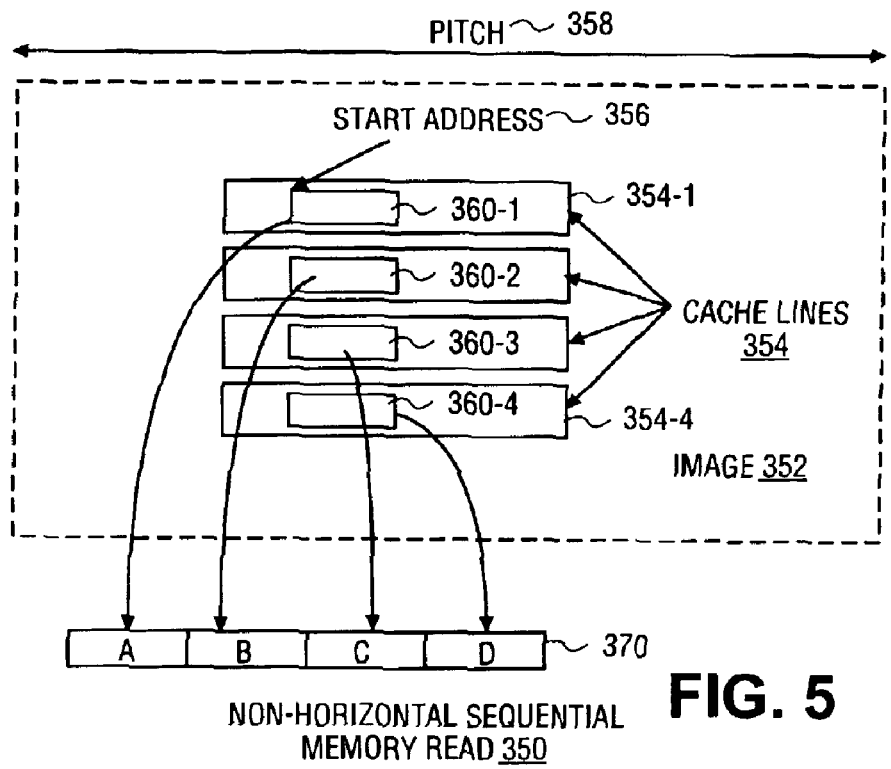
FIG. 5 depicts a block diagram illustrating a non-horizontally sequential memory read operation in accordance with one embodiment of the present invention.

Referring now to FIG. 5, FIG. 5 depicts a block diagram illustrating a non-horizontally sequential memory read 350 in accordance with one embodiment of the present invention. As illustrated, an image 352 includes an image block, which is comprised of cache lines 354 (354-1, . . . , 354-4). In order to process the image, the present invention describes memory-access (RT-Load) operations/instructions which enable vertical reading/writing of data beginning at a start address within each of the cache/memory lines into a destination data storage device 370. Such an operation is performed in response to a single instruction in contrast to conventional memory operation instructions, wherein data is sequentially read in a horizontal manner (horizontally sequential). As described herein, non-horizontally sequential memory access is not limited to vertical memory accesses. In one embodiment, non-horizontally sequential memory access may be performed according to a specific pattern, such as zigzag scan.

In order to support non-horizontally sequential memory-access (as depicted in FIG. 5) by, for example, a CPU, new instructions are provided as illustrated in FIG. 1. In one embodiment, a new instruction looks like the following:

RTMOV[B|W|D]2[Q|DQ] [MMX|XMM], start_addr, pitch

As illustrated in FIG. 5, the effect of the new instructions, say, RTMOVW2Q MM0, start_addr, pitch, is the following:

$$MM0[0 \ldots 15] \leftarrow [\text{start\_addr}] \tag{1}$$

$$MM0[16 \ldots 31] \leftarrow [\text{start\_addr+pitch}] \tag{2}$$

$$MM0[32 \ldots 47] \leftarrow [\text{start\_addr+pitch}*2] \tag{3}$$

$$MM0[48 \ldots 63] \leftarrow [\text{start\_addr+pitch}*3] \tag{4}$$

In one embodiment, the implementation of the RT load operation is performed in either the prefetch hardware or in a special hardware, such as a coprocessor.

Accordingly, as illustrated by operations 1–4, the instruction parameter MM0 refers to, for example, the destination data storage device 370, as depicted in FIG. 5. As described with reference to FIG. 1, the RTMOV operations support byte, word and doubleword non-horizontally sequential memory reads. However, those skilled in the art will appreciate that the present invention may be applied to any variation of byte multiples. Accordingly, the RTMOV operation is provided as, for explanatory purposes, and it should not be interpreted in a limiting sense.

As such, move operations 1–4 are implemented in response to a single RTMOV operation. In addition, the parameters 2Q and 2DQ within the RTMOV operation, direct the loading of a data block within the RT cache memory when a cache miss of data requested by an RT load operation is detected. Accordingly, in one embodiment, when dealing with the byte data, the parameter 2Q requires the loading of an 8×8 byte block of data within a corresponding portion of an RT cache memory. In addition, when dealing with the byte data detection of the 2DQ parameter requires loading of an 8-byte by 16-line block within a corresponding portion of the RT cache memory.

When dealing with word data, the 2Q parameter requires the loading of an 8-byte by 4-line block within the RT cache memory, while the 2DQ parameter requires the loading of an 8×8 byte block. Finally, when dealing with doubleword data, the 2Q parameter requires the loading of an 8-byte by 2-line block, while the 2DQ parameter requires the loading of an 8-byte by 4-line block. Accordingly, assuming the RT move operation as described above, if a cache miss of the requested data is detected, the operation performed would be as follows:

$$RT\ \text{Cache} \leftarrow [\text{astart\_addr}][0 \ldots 63] \tag{5}$$

$$RT\ \text{Cache} \leftarrow [\text{astart\_addr+pitch}][0 \ldots 63] \tag{6}$$

$$RT\ \text{Cache} \leftarrow [\text{astart\_addr+pitch}*2\ ][0 \ldots 63] \tag{7}$$

$$RT\ \text{Cache} \leftarrow [\text{astart\_addr+pitch}*3\ ][0 \ldots 63] \tag{8}$$

into the RT Cache, where aligned start address (astart_addr)=(start_addr & (~7)).

RT Cache Memory

Figure 6:
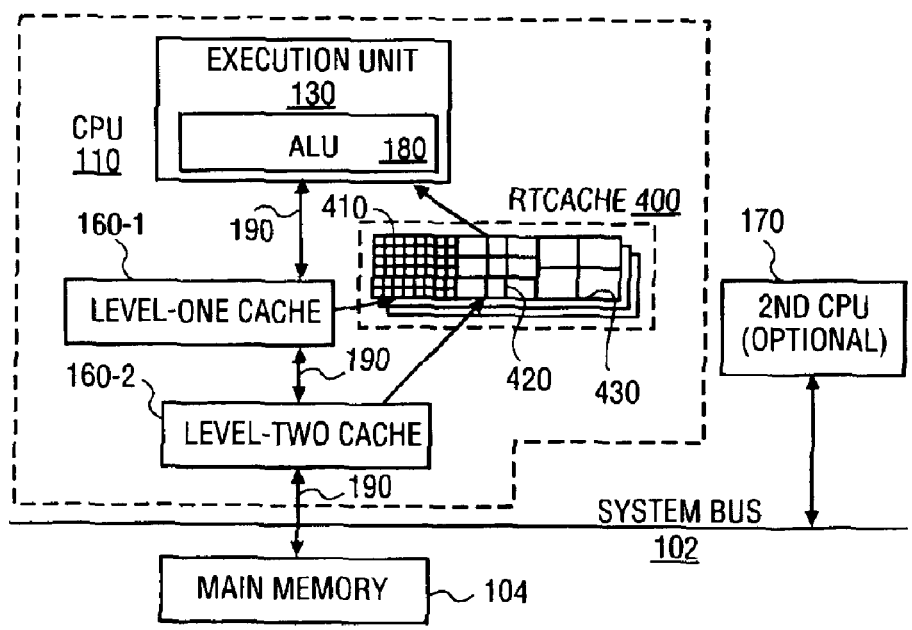
FIG. 6 depicts a block diagram further illustrating the computer system, as depicted in FIGS. 1 and 2, utilizing an RT cache memory, in accordance with a further embodiment of the present invention.

Referring now to FIG. 6, FIG. 6 further illustrates the computer system 100, as depicted in FIG. 1, in accordance with an embodiment utilizing an RT cache memory 400 for implementing RT load operations as described above. The RT cache memory 400, as illustrated, includes a byte buffer 410, a word buffer 420 and a doubleword buffer 430. However, those skilled in the art will appreciate that the RT cache memory 400 may be implemented using various byte multiples as its various data buffers. Accordingly, FIG. 6 is provided for explanatory purposes only, and should not be construed in a limiting sense.

In one embodiment, the RT cache 400 is referred to as a first memory buffer, while the level one cache 160-1 and the level two cache 160-2 are referred to as one or more second memory buffers. In one embodiment, the RT cache memory 400 is implemented utilizing, for example memory-transpose circuitry. Initially, data is loaded from one or more second memory buffers 160. Once loaded, the data is written into the circuitry horizontally (e.g., operations 5–8). Next, the data is vertically read from the memory-transpose circuitry (e.g., operations 1–4).

Figure 7A:
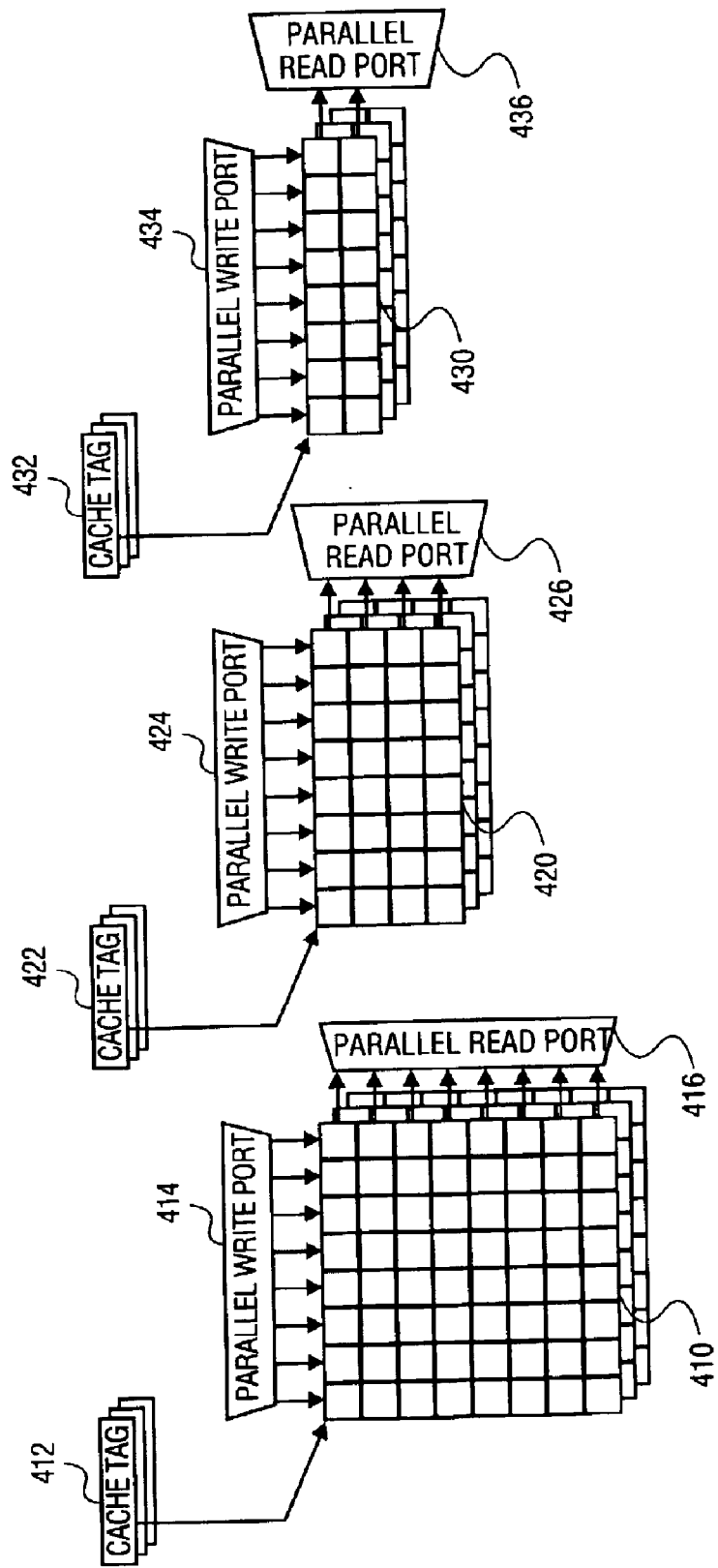
FIGS. 7A and 7B depict block diagrams further illustrating the RT cache, as depicted in FIG. 6, in accordance with a further embodiment of the present invention.

Referring now to FIG. 7A, FIG. 7A further illustrates the RT cache memory 400, as depicted in FIG. 6, in accordance with a further embodiment of the present invention. As illustrated, the data buffers of the RT cache (410, 420 and 430) each include a respective cache tag (412, 422 and 432) for determining a cache hit or miss of requested data within the respective data buffer. In addition, each data buffer includes a parallel write port (414, 424 and 434), as well as a parallel read port (416, 426 and 436).

For example, referring to the byte buffer 410 of the RT cache 400, the parallel write port 414 enables horizontal writing of data into the RT cache 400 (e.g., operations 5–8). The parallel read port 416 enables non-horizontally sequential memory reads (vertical memory reads) from the RT cache 400 (e.g., operations 1–4). Utilizing the various parallel write ports and parallel read ports, the processor 110 (FIG. 6) may access non-horizontally sequential memory data from the RT cache 400 in response to RT load operations. In the embodiment depicted in FIG. 7A, the parallel write ports and parallel read ports are connected to, for example, memory transpose circuitry as referred to above.

Figure 7B:
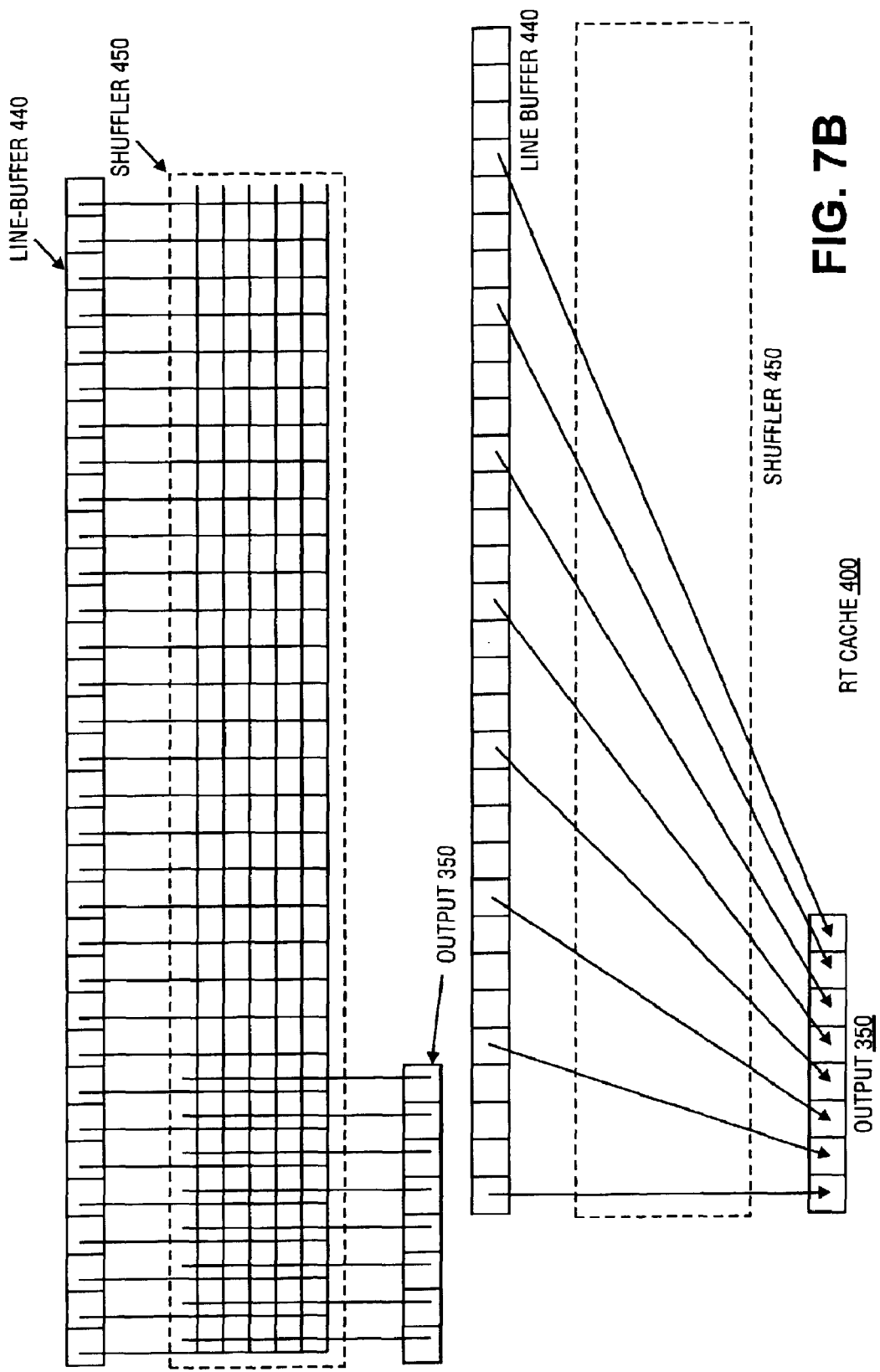

Referring now to FIG. 7B, FIG. 7B depicts an alternate embodiment of the RT cache memory 400 which utilizes a line buffer 440, as well as a data shuffler 450, to generate respective output data 370. As illustrated, the line buffer 440 is used to hold the data while the shuffler/crossbar 450 is used to gather the scattered data. Once gathered, the data is placed in output 370. Although the RT cache memory, as depicted in FIGS. 7A and 7B, utilizing memory transpose circuitry (FIG. 7A) or a line buffer 440 and shuffler 450 (FIG. 7B), those skilled in the art will recognized that various other means are encompassed by the present invention for implementing non-horizontally sequential memory access from a cache memory, as taught by the present invention. Accordingly, the embodiment described should not be interpreted in a limiting sense since the various embodiments are provided as one possible implementation of the present invention.

As such, utilizing an RT cache memory 400, the execution unit 130 is not restricted to conventional access of memory data in a horizontally sequential order from the RT cache memory 400 in response to RT load operations. In doing so, the computer system 100 may be utilized to perform image processing operations in an improved and efficient manner beyond conventional computer systems. As will be described in further detail below, utilizing the RT load operations as well as the RT cache memory, the present invention can simplify pixel padding procedures as well as image filtering. Hence, image processing operations are simplified by utilizing non-horizontally sequential memory access, such as for example, vertically reading data from an image block, as illustrated in FIG. 5.

Cache Coherence

In one embodiment, a subset of the MESI (modified (M), exclusive (E), shared (S) and invalid (I)) cache line states, S and I, are implemented by the RT-Cache 400, assuming the embodiment described does not support RT-Write operation. In the event of RT-Load misses, the RT-Cache issues a request to L1/L2 cache 160. A lookup is performed in the L1/L2 cache 160, resulting in a hit or a miss. If a hit is detected, the requested block of data is supplied to the RT-Cache 400. The block of data is placed in the RT-Cache 400 with the S state. If the request results in a cache miss, the L1/L2 cache 160 may issue a request to the external bus interface and the block of data is read from external memory 104.

During the transaction's snoop phase, other caches (e.g., cache memories within co-processors 170) report whether or not they have a copy of the data block. If any other processor's cache has a copy in the M state, the line is supplied from that cache and is placed in the L1/L2 cache 160 and RT-Cache 400 in the S state. At the same time when the M block of data is supplied to RT-Cache 400, the block of data is written into memory 104. The block of data in the other cache (e.g., co-processor 170 cache memory) is therefore no longer different than memory 104.

As such, a state of the block of data transitions from the M to the S state. When no other cache has a copy (snoop miss) or any other cache (this processor or other processor) has a copy in the E or S state, the block of data is read from memory 104. The L1/L2 cache 160 and the RT-Cache 400 place their copies in the S state upon completing the data block read from memory 104. Any other cache (other processor) has a copy, the block of data is also in the S state.

To support block-based algorithms for arbitrary shape video object coding in moving picture experts group-four (MPEG-4), a padding algorithm has been introduced. The MPEG-4 specification states that horizontal padding must be done before the vertical padding. Unfortunately, vertical padding is much harder to implement efficiently with conventional instructions due to the fact that contiguous bytes in memory are in the same row, not the same column. As will be illustrated by comparing FIGS. 8A and 8B, utilizing the RTLoad operations, as described herein, avoids the image transpose steps (502 and 506) utilized by a conventional pixel padding operation 500 (FIG. 8A).

Figure 8A:
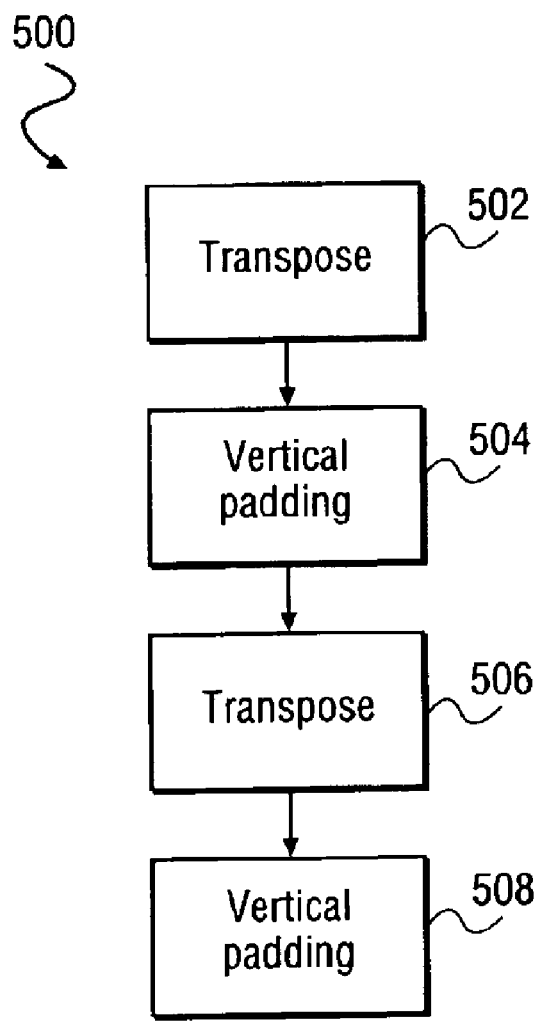
FIGS. 8A depicts a block diagram illustrating a conventional method for performing pixel padding as known in the art.

Referring now to FIG. 8A, FIG. 8A depicts the conventional pixel padding method 500. At process block 502, the image block is transposed. After the block is first transposed, the block is padded in the vertical direction at process block 504. This is equivalent to padding in the horizontal direction. The matrix is then transposed at process block 506 and padded in the vertical direction a second time at process block 506. Assembly code for implementing the connection pixel padding procedure 500 using MMX™ m instructions is illustrated in Table 1, assuming, for simplicity, that pixel averaging is ignored.

Figure 8B:
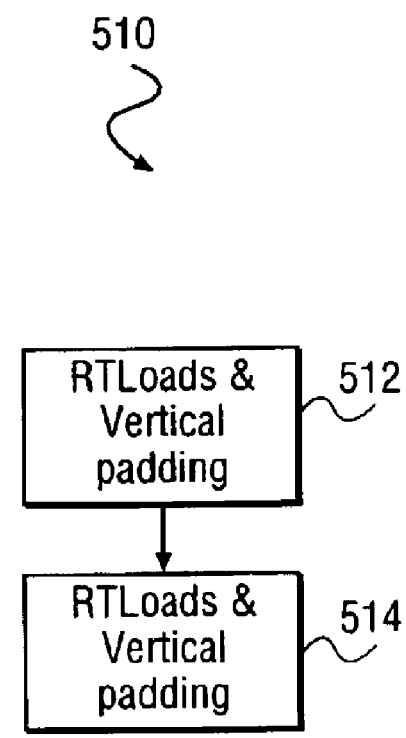
FIG. 8B depicts a method illustrating a pixel padding procedure utilizing an RT load operation in accordance with one embodiment of the present invention.

On the other hand, as shown in Table 3, the RT-Load operation enables combining transpose operations into one single operation with the repetitive pixel padding procedure. This RT-Load pixel padding procedure 510 is illustrated in FIG. 8B. The whole pixel padding procedure 510 is now just executing the same code twice. The new code is estimated to have achieved higher performance over the conventional pixel padding procedure 500.

Referring now to FIGS. 9A–E, FIGS. 9A–9E depict an example of the conventional pixel padding procedure. FIG. 9A depicts an original block. FIG. 9B depicts a transpose of original block. FIG. 9C depicts a vertical padding. FIG. 9D depicts a transpose of the vertically-padded transposed block, which is equivalent to the horizontally-padding the block. FIG. 9E depicts vertical padding.

TABLE 1

Code For Simple Vertical Padding (Without Re-tiling Instructions)

```
twopassfillsimple:
    mov     edi, transposedpixelptr
    mov     esi, transposedmaskptr
    mov     ecx, 7          ;loop counter
passloop 1 simple:
    movq    mm1, [esi+8]    ;mm1 ← M2
    movq    mm0, [edi+8]    ;mm0 ← P2
    movq    mm5, mm1        ;mm5 ← M2
    pandn   mm1, [edi]      ;mm1 ← P1 AND (NOT M2)
                            ;do bitwise not of the mask of the
```

TABLE 1-continued

Code For Simple Vertical Padding (Without Re-tiling Instructions)

```
                                  ;current line, and it with the pixels
                                  ;of the last line
        por     mm0, mm1          ;mm0 ← P2 + [P1 AND (NOT M2)]
                                  ;and add them together. This "smears"
                                  ;the pixels in the down direction.
        por     mm5, [esi]        ;mm5 ← M2 + M1
                                  ;change the mask
        movq    [edi+8], mm0
        movq    [esi+8], mm5
        add     esi, 8
        add     edi, 8
        loop    passloop1simple
        mov     ecx, 7            ;loop counter
        sub     esi, 8
        sub     edi, 8
passloop2simple:
        movq    mm1, [esi]        ;this does the same thing but in
        movq    mm0, [edi]        ;reverse this time
        movq    mm5, mm1
        pandn   mm1, [edi+8]
        por     mm0, mm1
        por     mm5, [esi+8]      ;the new mask! all pixels which are
        movq    [edi], mm0        ;in either row
        movq    [esi], mm5
        sub     esi, 8
        sub     edi, 8
        loop    passloop2simple
```

TABLE 2

Code Of Transposing An 8 × 8 Matrix

| | |
|---|---|
| mov ecx, eax | punpckhdq mm1, mm5 |
| mov edx, eax | movq [edi], mm1 |
| shl ecx, 2 | add edi, ebx |
| shl edx, 2 | |
| sub ecx, eax | movq mm0, [esi] |
| | movq mm1, [esi+eax] |
| movq mm0, [esi] | punpckhbw mm0, mm1 |
| movq mm1, [esi + eax] | movq mm2, [esi + 2*eax] |
| punpcklbw mm0, mm1 | movq mm3, [esi + ecx] |
| movq mm2, [esi + 2*eax] | add esi, edx |
| movq mm3, [esi + ecx] | punpckhbw mm2, mm3 |
| add esi, edx | |
| punpcklbw mm2, mm3 | movq mm4, [esi] |
| | movq mm5, [esi + eax] |
| movq mm4, [esi] | punpckhbw mm4, mm5 |
| movq mm5, [esi + eax] | movq mm6, [esi + 2*eax] |
| punpcklbw mm4, mm5 | movq mm7, [esi + ecx] |
| movq mm6, [esi + 2*eax] | punpckhbw mm6, mm7 |
| movq mm7, [esi + ecx] | movq mm1, mm0 |
| punpcklbw mm6, mm7 | movq mm3, mm2 |
| | movq mm5, mm4 |
| movq mm1, mm0 | movq mm7, mm6 |
| movq mm3, mm2 | |
| movq mm5, mm4 | punpcklwd mm0, mm2 |
| movq mm7, mm6 | punpcklwd mm4, mm6 |
| | movq mm6, mm0 |
| sub esi, edx | |
| | punpckldq mm0, mm4 |
| punpcklwd mm0, mm2 | movq [edi], mm0 |
| punpcklwd mm4, mm6 | add edi, ebx |
| movq mm6, mm0 | |
| | movq mm0, mm6 |
| punpckldq mm0, mm4 | punpckhdq mm0, mm4 |
| movq [edi], mm0 | movq [edi], mm0 |
| add edi, ebx | add edi, ebx |
| movq mm0, mm6 | |
| punpckhdq mm0, mm4 | punpckhwd mm1, mm3 |
| movq [edi], mm0 | punpckhwd mm5, mm7 |
| add edi, ebx | movq mm7, mm1 |
| punpckhwd mm1, mm3 | punpckldq mm1, mm5 |
| punpckhwd mm5, mm7 | movq [edi], mm1 |
| movq mm7, mm1 | add edi, ebx |
| punpckldq mm1, mm5 | movq mm1, mm7 |
| movq [edi], mm1 | |
| add edi, ebx | punpckhdq mm1, mm5 |
| movq mm1, mm7 | movq [edi], mm1 |

TABLE 3

Code For Vertical Padding With Re-tiling Instructions

```
twopassfillsimple:
        mov     edi, pixelptr
        mov     esi, maskptr
        mov     eax, 8
        rtmovq  mm2, [edi], eax       ;mm2 ← M1
        rtmovq  mm4, [esi], eax       ;mm4 ← P1
        mov     edx, transposedpixelptr
        mov     ebx, transposedmaskptr
        movq    [edx], mm2
        movq    [ebx], mm4
        mov     ecx, 7                ;loop counter
passloop1simple:
        rtmovq  mm1, [esi+8], eax     ;mm1 ← M2
        rtmovq  mm0, [edi+8], eax     ;mm0 ← P2
        movq    mm5, mm1              ;mm5 ← M2
        pandn   mm1, mm2              ;mm1 ← P1 AND (NOT M2) do bitwise not of the
                                      ;mask of the current line, and it with the pixels of
                                      ;the last line
        por     mm0, mm1              ;mm0 ← P2 + [P1 AND (NOT M2)] and add them
                                      ;together. This "smears" the pixels in the down
                                      ;direction.
        por     mm5, mm4              ;mm5 ← M2 + M1 change the mask
        movq    [edx+8], mm0
        movq    mm2, mm0
        movq    [ebx+8], mm5
        movq    mm4, mm5
```

TABLE 3-continued

Code For Vertical Padding With Re-tiling Instructions

```
        add     esi, 8
        add     edi, 8
        add     ebx, 8
        add     edx, 8
        loop    passloop1simple
        mov     ecx, 7              ;loop counter
        sub     esi, 8
        sub     edi, 8
        sub     ebx, 8
        sub     edx, 8
passloop2simple:
        movq    mm1, [ebx]          ;this does the same thing but in
        movq    mm0, [edx]          ;reverse this time
        movq    mm5, mm1
        pandn   mm1, [edx+8]
        por     mm0, mm1
        por     mm5, [ebx+8]        ;the new mask! All pixels which are
        movq    [edi], mm0          ;in either row
        movq    [esi], mm5
        sub     esi, 8
        sub     edi, 8
        sub     ebx, 8
        sub     edx, 8
        loop    passloop2simple
```

Another application example is image filtering with separable filters, as depicted in FIGS. 10A–10C. This kind of operations will be used for example in the future for the generation of half pixel position for half-pel motion estimation in H.26L (as defined in the Test Model Long Term H.26L version 8, by the ITU Video Coding Experts Group in June 2001). This operation produces an image with a doubled horizontal and a doubled vertical direction using a filter with 6 coefficients.

Referring now to FIG. 10A, the 'x'-es within image 550 represent integer pixel positions that are available from the original image. First the '+'-es (horizontal_pixel positions) are produced by using a 6 tap filter: (1,–5,20,20,–5,1)/32. The result is rounded to the nearest integer and clipped to the range 0 to 255. Then all the '*'-es are produced by using the same 6 tap. The result is rounded to the nearest integer and clipped to the range 0 to 255. If the filtering process refer to a pixel outside the picture, it is replaced by the nearest picture edge pixel.

The current best possible implementation (state of the art) is shown in FIG. 10B. Unfortunately, two transpositions are required in order to do the vertical filtering accessing data in a horizontal way. Using the propose RT-Load operations, it is possible to do the vertical upsampling and filtering without the transpose operation. The upsampling function is done with RT-Loads, which is equivalent to a transpose operation (the image size is then 2·height times 2·width). Then the vertical filtering operation is done on the image with RT-Loads. Next, the operation transposes the image again (the image has the correct orientation and size) as illustrated by blocks 582–594 depicted in FIG. 10C. The estimated improvement using the RT-Load operations is 2.1×.

Figure 11:
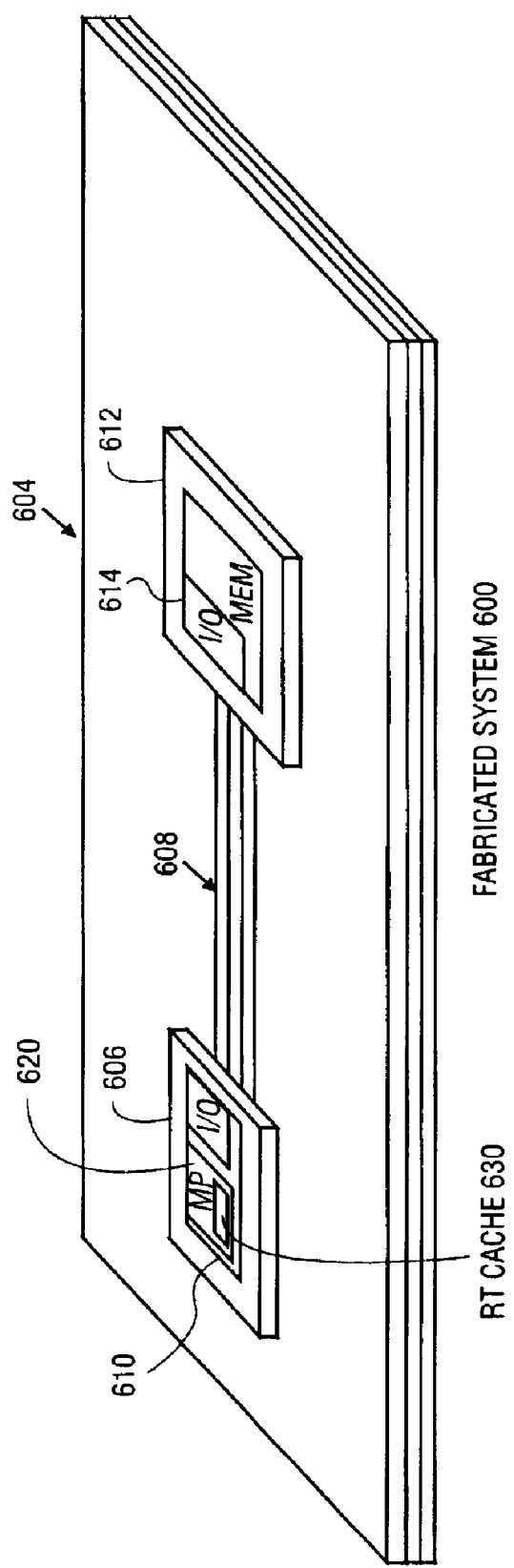
FIG. 11 depicts a block diagram illustrating an electronic system 600 implementing an RT cache memory supporting non-horizontally sequential memory access, in accordance with one embodiment of the present invention.

Turning now to FIG. 11, what is shown is a block diagram of an embodiment of an electronic system 600 in which a processor features the RT cache memory as described above. The system includes a multi-layer printed wiling board 604 on which a parallel bus 608 is formed. The bus 608 may be of the point to point variety, or a multi-drop bus such as those used in a main memory. Alternatively, the bus 608 may be implemented utilizing optical signals between the various chip packages where optical/electrical conversion is required. An integrated circuit (IC) chip package 606 is operatively installed on the board to communicate using the parallel bus 608. The installation of the package 606 may be done by a surface mount technique or via a connector or socket.

In addition, the package has an IC chip 610 that includes a logic function section, and an I/O section as an interface between the logic function section and the bus 608. In one embodiment, the logic function is a microprocessor, including the RT cache memory, as described above. Alternatively, other devices that can be implemented in the logic function section of an IC chip may be used such as a memory controller, and a bus bridge. The I/O section has a bus receiver in which an equalization loop as described above is provided.

A second IC package 612 is also installed on the board 604 to communicate with the first package 606 via the bus 608. The second IC package 612 also includes a chip 614 having an I/O section in which a bus receiver is provided to interface the bus 608, and its own logic function section (here shown as a memory controller). Those skilled in the art will recognize that fabricated system 600 is provided for illustration purposes and should not be interpreted in a limiting sense. Moreover, the various IC packages may be embodied within separate boards or combined as required by specific implementation details. Furthermore, communication between the various components is not limited to electrical signals and includes optical communication, micro-electro mechanical communication signals or the like.

According to an embodiment, processor 620 utilizes an RT cache memory 630, as described above. Thus, in such an embodiment, processor 620 can perform non-horizontally sequential access of data contained within the RT cache memory 630 in response to a single RT load instruction. Other system applications of the RT cache 630 are possible, including, for example, a memory controller. By using an RT cache memory 400, the processor is able to vertically read/write data within corresponding portions of the RT cache 400. Procedural methods for implementing the embodiments of the present invention are now described.

Operation

Figure 12:
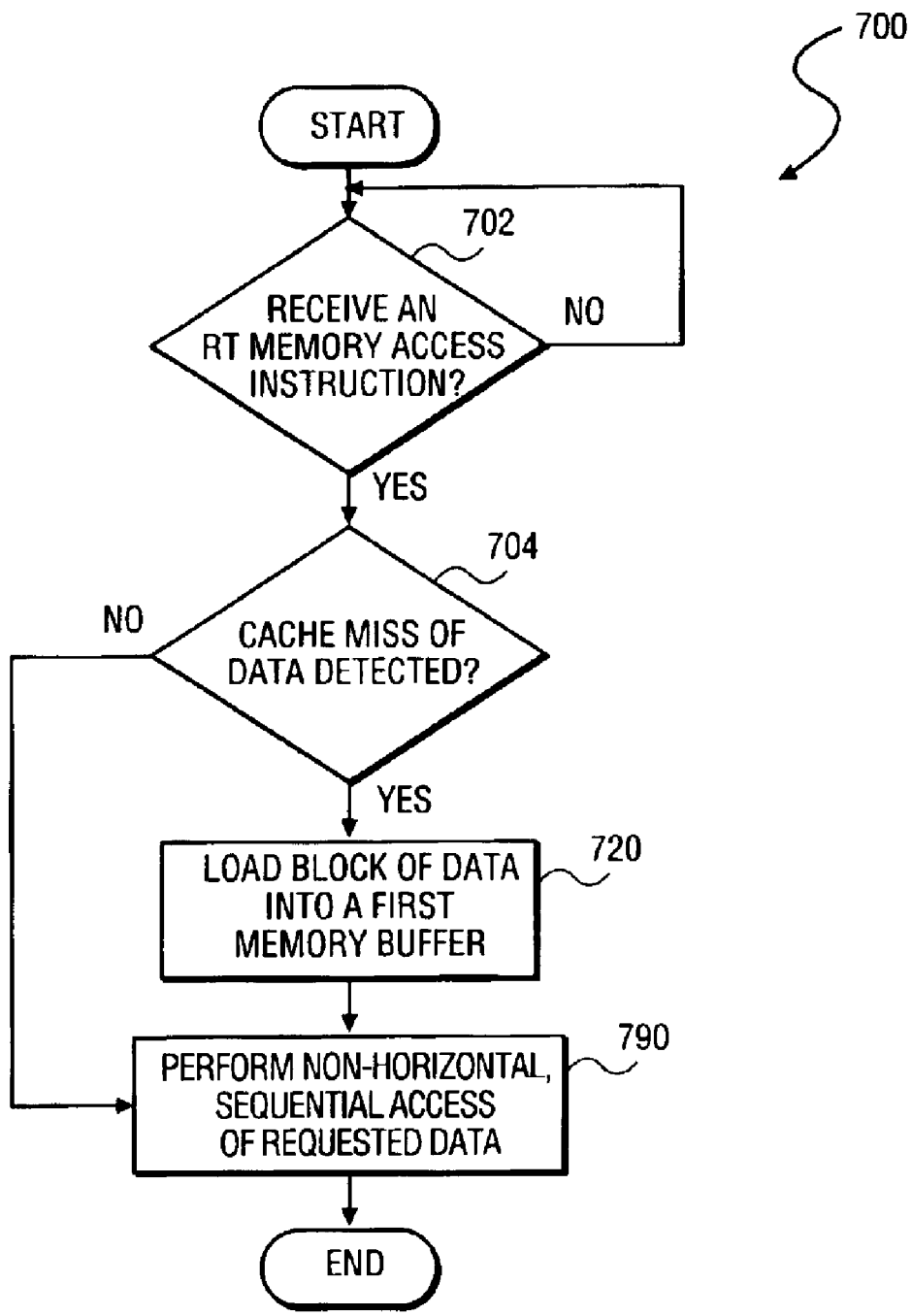
FIG. 12 depicts a flowchart illustrating a method for performing non-horizontally sequential access in response to a memory-access instruction in accordance with one embodiment of the present invention.

Referring now to FIG. 12, FIG. 12 depicts a flowchart illustrating a method 700 for performing a non-horizontally sequential memory-access from a first memory buffer, such as the RT cache memory 400 of the computer system 100, depicted in FIGS. 1, 2 and 6–7B. At process block 702, it is determined whether an RT memory-access instruction is received. The RT memory-access instructions include, for example, but are not limited to, the RTMOV instructions (142-158), as depicted in FIG. 1. Once an RT memory-access instruction is received, at process block 704, it is determined whether a cache miss of data requested by the memory-access instruction is detected. When a cache miss is detected, process block 720 is performed.

At process block 720, a block of data is loaded within the first memory buffer. The size of the block of data, in accordance with one embodiment, is determined by the 2DQ/2Q parameter of the RTMOV operations, as depicted in FIG. 1. Accordingly, depending on the data type of the RTMOV operation, a data block containing the data requested by the memory-access instruction will be loaded within the cache memory 400. Finally, at process block 790, the CPU may perform a non-horizontally sequential access of data requested by the memory-access instruction.

Figure 13:
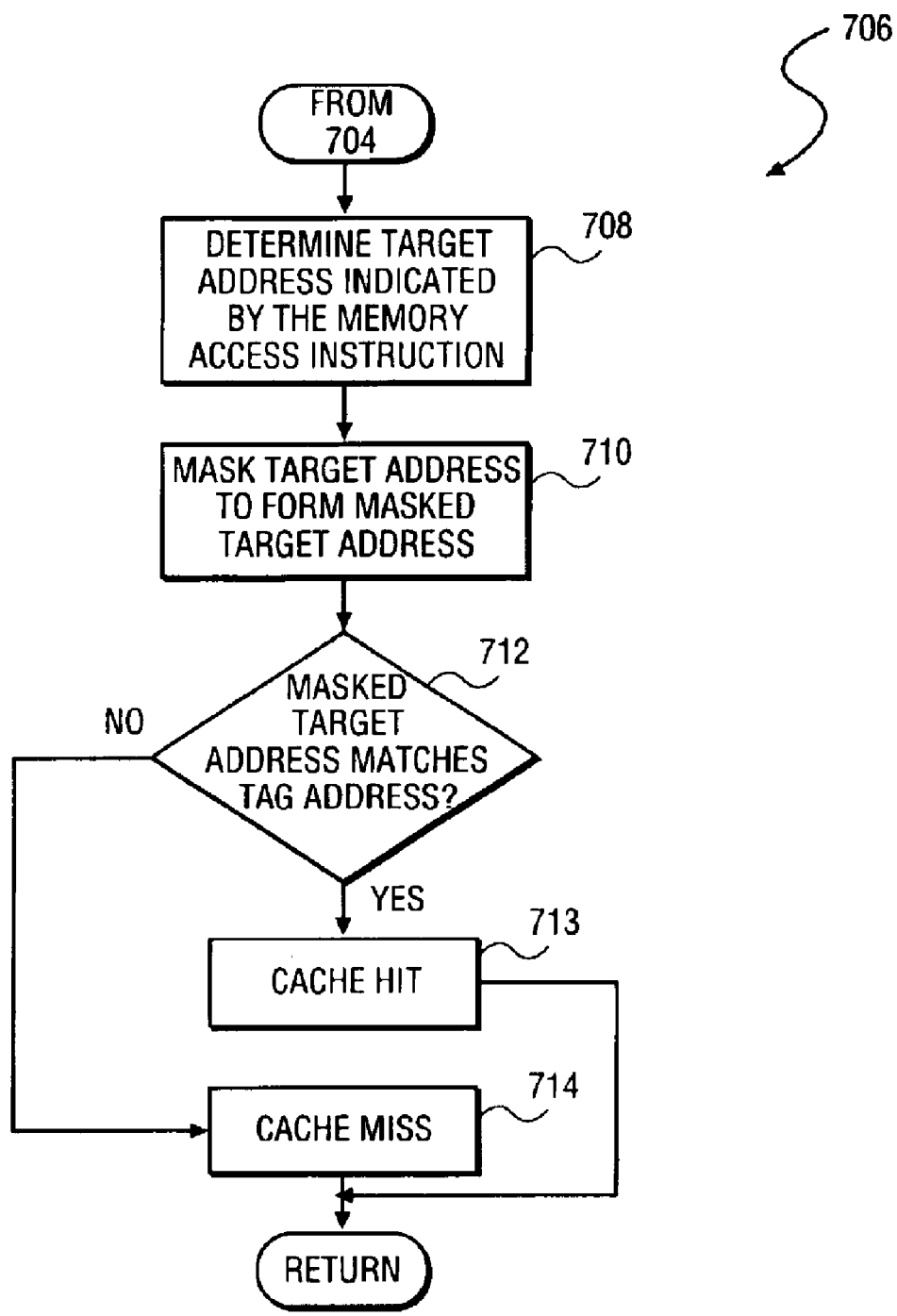
FIG. 13 depicts a flowchart illustrating an additional method for detecting a cache hit/miss of data requested by a memory-access operation in accordance with a further embodiment of the present invention.

Referring now to FIG. 13, FIG. 13 depicts a flowchart illustrating an additional method 706 for detecting a cache hit/miss of data requested by the memory-access instruction within the first memory buffer, such as RT-Cache 400 as depicted in FIG. 6. At process block 708, a target address indicated by the memory-access instruction is determined. Once determined, at process block 710, the target address is masked to form a masked target address. Once the masked target address is formed, at process block 712, it is determined whether the masked target address matches the tag address. When a match is detected, a cache hit is determined at process block 713. Otherwise, a cache miss is detected at process block 714.

Figure 14:
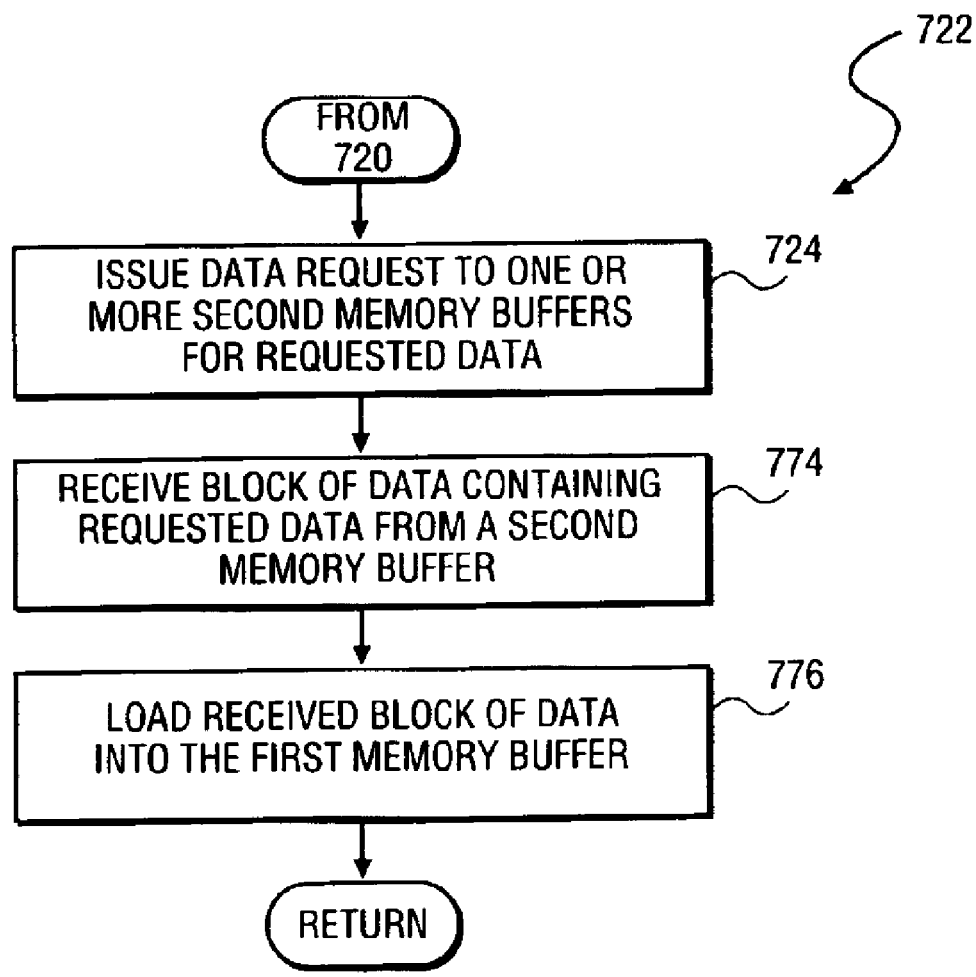
FIG. 14 depicts a flowchart illustrating an additional method for loading a block of data within a first memory buffer in accordance with a further embodiment of the present invention.

Referring now to FIG. 14, FIG. 14 depicts a flowchart illustrating an additional method 722 for loading a block of data within the first memory buffer of process block 720, as depicted in FIG. 12. At process block 724, the RT-cache 400 will issue a data request to one or more second memory buffers. As depicted with reference to FIG. 6, the RT-cache 400 would issue a data request to both the level-one cache 160-1 and the level-two cache 160-2.

Next, at process block 774, the block of data containing the requested data is received from a second memory buffer of the one or more second memory buffers. As described, the one or more second memory buffers refer to the level-one cache 160-1 and the level-two cache 160-2 of the computer system 100, as depicted in FIG. 6. Finally, at process block 776, the block of data is loaded into the RT cache memory 400, which is interchangeably referred to herein as a first memory buffer.

Figure 15:
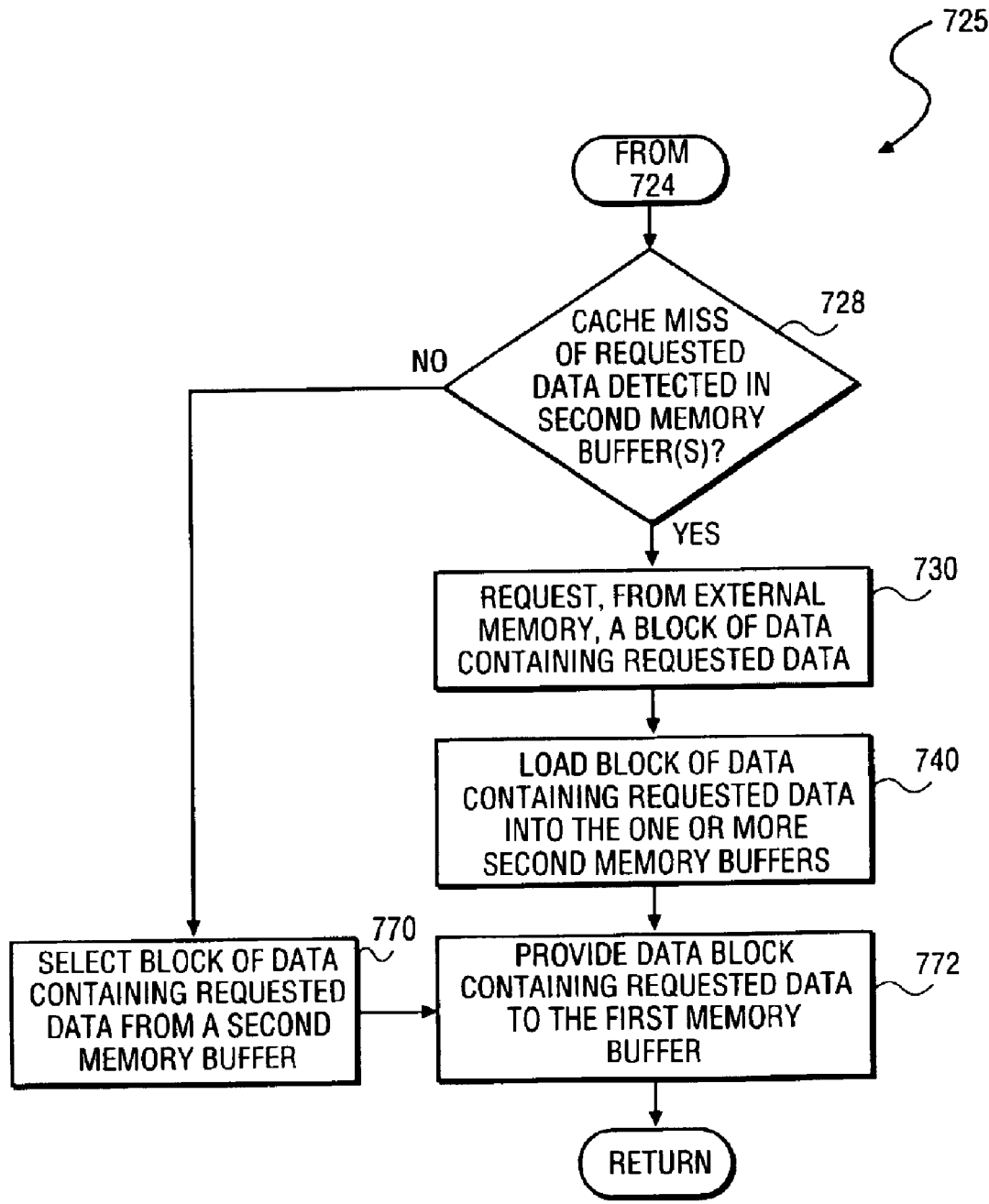
FIG. 15 depicts a flowchart illustrating an additional method for issuing a data request to one or more second memory buffers in accordance with a further embodiment of the present invention.

Referring now to FIG. 15, FIG. 15 depicts a flowchart illustrating an additional method for issuing the data request of process block 724, as depicted in FIG. 14. At process block 728, it is determined whether a cache miss is detected when the data associated with the memory-access instruction is requested from the second memory buffer(s). When a cache miss is detected, process block 730 is performed. Otherwise, process block 770 is performed. At process block 730, CPU 110, for example, will request from an external memory 104, a block of data containing the data requested by the memory-access instruction. In one embodiment, as illustrated with reference to FIG. 6, the CPU 110 would request a block of data from main memory 104.

At process block 740, the block of data containing the requested data is loaded into the one or more second memory buffers, for example, level-one cache 160-1 and level-two cache 160-2, as depicted in FIG. 6. However, when a cache hit is detected within the one or more second memory buffers, the block of data is selected from a second memory buffer (160-1/160-2) containing the requested data at process block 770. Finally, at process block 772, the data block containing the requested data is provided to the first memory buffer, for example, RT cache memory 400.

Figure 16:
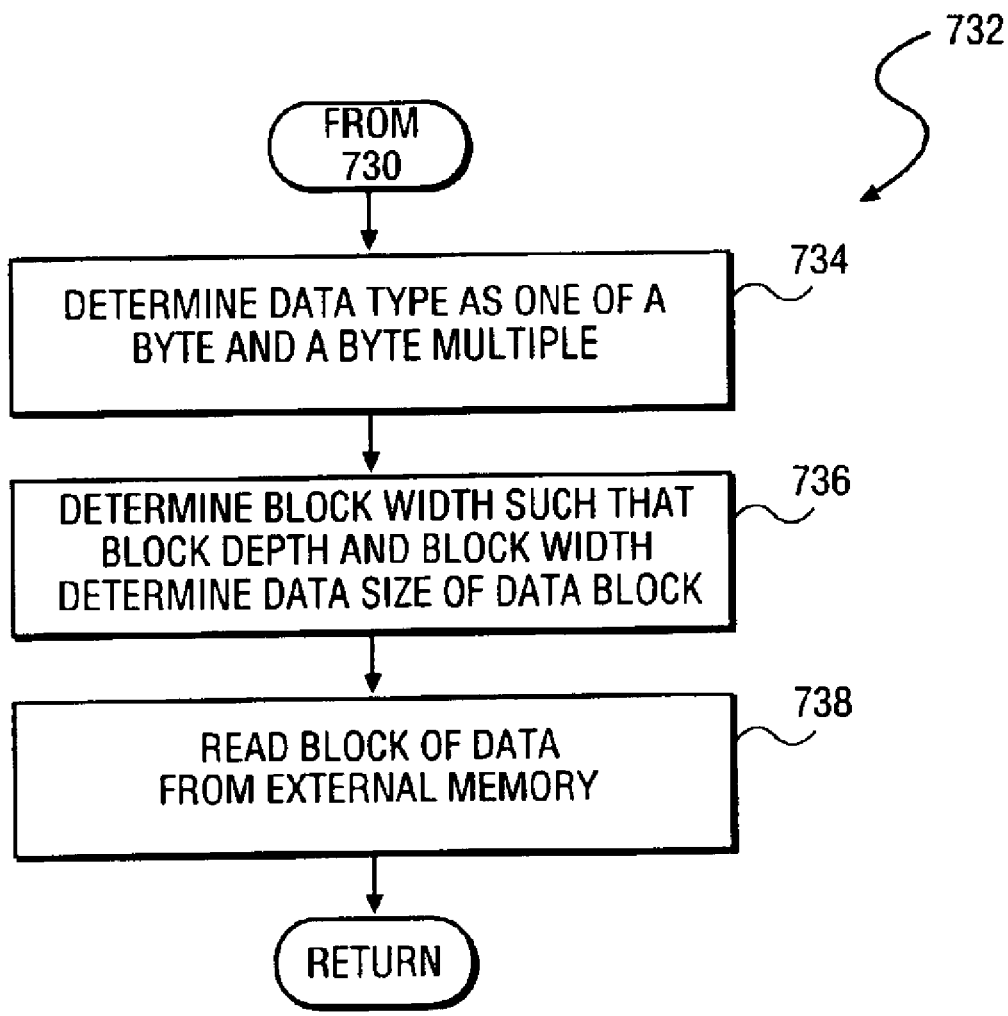
FIG. 16 depicts a flowchart illustrating an additional method for requesting a data block from an external memory in accordance with a further embodiment of the present invention.

Referring now to FIG. 16, FIG. 16 depicts a flowchart illustrating an additional method 732 for requesting the block of data from external memory 104 of process block 730, as depicted in FIG. 15. At process block 734, a data type of the requested data is determined as a byte or a byte multiple, such as a word or a doubleword. Once the data type is determined, at process block 736, a block width of the requested data is determined, such that the block depth and block width determine a data size of the data block. Finally, at process block 738, the data block is read from the external memory according to the data size determined at process block 736, such as for example, main memory 104, as depicted in FIG. 6. Note that this flowchart is not only applicable to 730, but also to 770 and 790.

Figure 17:
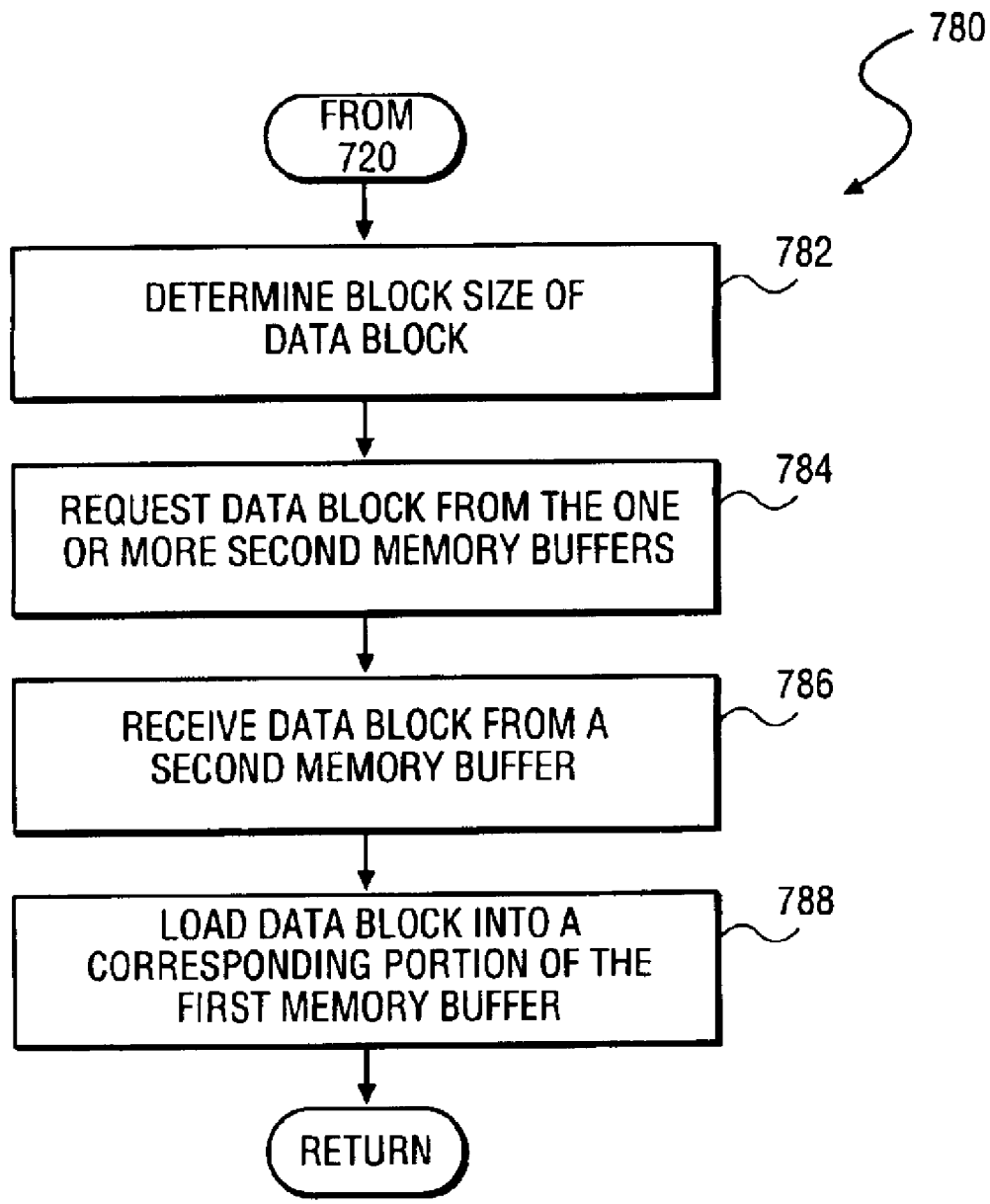
FIG. 17 depicts a flowchart illustrating an additional method for loading a block of data within the memory buffer in accordance with an exemplary embodiment of the present invention.

Referring now to FIG. 17, FIG. 17 depicts a flowchart illustrating an additional method 780 for loading a block of data into the first memory buffer of process block 720, as depicted in FIG. 12. At process block 782, a block size of the data block is determined. Next, at process block 784, the data block is requested from the one or more second memory buffers, for example, level one cache and level two cache 160, as depicted in FIG. 6. Next, at process block 736, the block of data is received from a second memory buffer. Finally, at process block 788, the block of data is loaded into a corresponding portion of the first memory buffer. For example, referring to FIG. 6, depending on a data type associated with the RTMOV operation, the block of data would be stored into the byte portion 410, the word portion 420 or the doubleword portion 430 of the RT cache memory 400, as depicted in FIG. 6.

Figure 18:
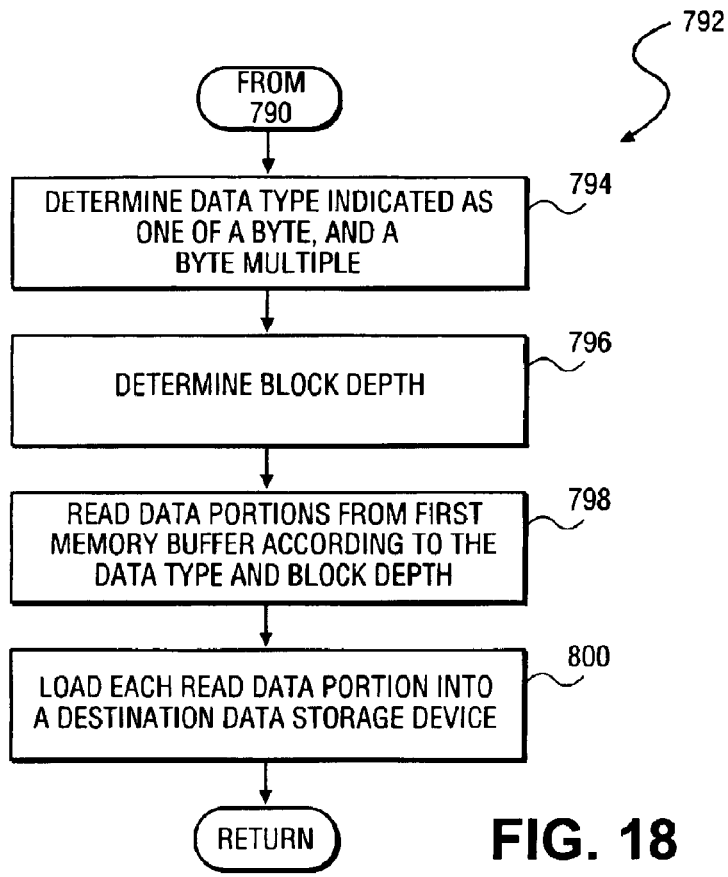
FIG. 18 depicts a flowchart illustrating an additional method for performing a non-horizontally sequential access in accordance with an exemplary embodiment of the present invention.

Referring now to FIG. 18, FIG. 18 depicts a flowchart illustrating an additional method 792 for performing the non-horizontally sequential access of requested data of process block 790, as depicted in FIG. 12. At process block 794, a data type indicated by the memory-access operation is determined as one of a byte or a byte multiple, such as a word, a doubleword, a quadword or the like. Next, at process block 796, a block depth is determined according to the memory-access instruction. Next, at process block 798, the requested data is vertically read from the RT cache memory 400. Finally, at process block 800, the vertically read data portions are loaded into a destination data storage device.

Figure 19:
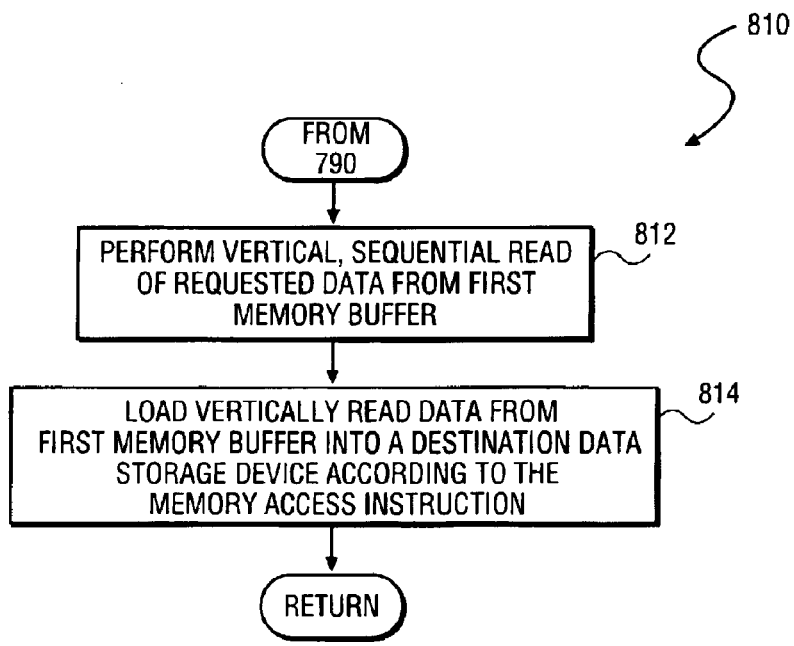
FIG. 19 depicts a flowchart illustrating a method for loading non-horizontally, sequentially accessed data within a destination data storage device in accordance with an exemplary embodiment of the present invention.

Finally, referring to FIG. 19, FIG. 19 depicts a flowchart illustrating an additional method 810 for performing a non-horizontally sequential access of requested data from, for example the RT cache memory 400. At process block 812, a vertical, sequential memory read of the requested data is performed from the first memory buffer, such as for example RT cache memory 400. Once the data is read, process block 814 is performed. At process block 814, the vertically read data is loaded from the first memory buffer 400 into a destination data storage device according to the memory-access instruction.

Consequently, utilizing the embodiments of the present invention, an RT cache in conjunction with the RT load instructions described herein enable non-horizontally sequential memory access within the RT cache memory. Accordingly, a CPU utilizing an RT cache memory 400 may perform vertical reads of data, which are provided during image processing operation. As such, computer systems utilizing the teachings of the present invention can drastically improve, for example, image processing times by utilizing the RT load operations to perform vertical reads of data in response to a single instruction. As such, many of the transpose operations required when processing pixel data in non-horizontal directions are avoided utilizing the teachings of the present invention.

In one embodiment, hardware prefetchers can use the memory requests to the first memory buffer to prefetch data into the RTCache memory 400.

Alternate Embodiments

Several aspects of one embodiment of the RT load operation for performing non-horizontally sequential memory access of data within the RT cache have been described. However, various embodiments of the RT load cache and RT load instructions provide numerous features including, complementing, supplementing, and/or replacing the features of the embodiment described above. Features can be implemented as part of a processor or as part of a memory controller in different embodiments. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

In addition, although an embodiment described herein is directed to an RT cache, it will be appreciated by those skilled in the art that the embodiments of the present invention can be applied to other systems. In fact, systems for performing non-horizontally sequential memory access fall within the embodiments of the present invention, without departing from the scope and spirit of the present invention. The embodiments described above were chosen and described in order to best explain the principles of the invention and its practical applications. These embodiment were chosen to thereby enable others skilled in the art to best utilize the various embodiments of the invention with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such sub-assemblies may be used in other embodiments of the invention. Changes may be made in detail, especially matters of structure and management of parts within the principles of the present invention to the full extent indicated by the broad general meaning of the terms in which the appended claims are expressed.

The embodiments of the present invention provides many advantages over known techniques. In one embodiment, the present invention includes the ability to enable non-horizontally sequential memory access within the RT cache memory. Accordingly, a CPU utilizing an RT cache memory 400 may perform vertical reads of data, which are provided during image processing operation. As such, graphic subsystems utilizing the teachings of the present invention can drastically improve image processing times by utilizing the RT load operations to perform vertical reads of data in response to a single instruction. As such, many of the transpose operations required when processing pixel data in non-horizontal directions are avoided utilizing the teachings of the present invention.

Having disclosed exemplary embodiments and the best mode, modifications and variations may be made to the disclosed embodiments while remaining within the scope of the invention as defined by the following claims.

What is claimed is:

1. A method comprising:
   detecting, in response to a memory-access instruction, a buffer hit/miss of data requested by the memory-access instruction within a first memory buffer;
   when a buffer miss is detected, loading a block of data into the first memory buffer according to the memory-access instruction, the block of data containing the data requested by the memory-access instruction; and
   performing non-horizontally sequential access of the data requested by the memory-access instruction from the first memory buffer.

2. The method of claim 1, wherein detecting a buffer hit/buffer miss further comprises:
   determining a target address indicated by the memory-access instruction as corresponding to the data requested by the memory-access instruction;
   masking the target address to form a masked target address;
   when the masked target address matches a tag address, detecting a buffer hit; and
   otherwise, detecting a buffer miss.

3. The method of claim 1, wherein loading the block of data further comprises:
   issuing a data request to one or more second memory buffers for the data requested by the memory-access instruction;
   receiving the block of data containing the data requested by the memory-access instruction from a second memory buffer of the one or more second memory buffers; and
   loading the received block of data into the first memory buffer.

4. The method of claim 3, wherein issuing the data request further comprises:
   detecting, in accordance with the data request, a buffer hit/buffer miss of the data requested by the memory-access instruction within the one or more second memory buffers;
   when a buffer miss is detected, requesting from an external memory, a block of data containing the data requested by the memory-access instruction;
   once the block of data is received, loading the block of data into the one or more second memory buffers;
   otherwise, selecting the block of data containing the data requested by the memory-access instruction from a second memory buffer of the one or more second memory buffers according to the memory-access instruction; and
   providing the data block containing the data requested by the memory-access instruction to the first memory buffer.

5. The method of claim 1, wherein loading the block of data further comprises:
   determining a block size of the data block according to the memory-access instruction;
   requesting the data block from one or more second memory buffers according to the determined block size;
   receiving the data block from a second memory buffer of the one or more second memory buffers; and loading the data block into a corresponding portion of the first memory buffer according to the memory-access instruction.

6. The method of claim 1, wherein performing the non-horizontally sequential access further comprises:

determining a data type indicated by the memory-access instruction as one of a byte and a byte multiple;

determining a block depth indicated by the memory-access instruction;

reading data portions, corresponding to the determined data type and according to the determined block depth, from the first memory buffer; and loading each read data portion into a destination data storage device according to the memory-access instruction.

7. The method of claim 1, wherein performing the non-horizontal access further comprises:

performing a vertical read of data requested by the memory-access instruction from the first memory buffer; and loading the data read from the first memory buffer into a destination data storage device according to the memory-access instruction.

8. The method of claim 4, wherein requesting the data block further comprises:

determining a data type indicated by the memory-access instruction as one of a byte and a byte multiple;

determining a block width according to the data type indicated by the memory-access instruction, such that the block depth and block width determine a data size of the data block;

reading a block of data, according to the determined data size, from the external memory.

9. The method of claim 4, further comprising:

maintaining coherence of the data block containing the data requested by the memory-access instruction among the first memory buffer, the second memory buffers and the external memory.

10. The method of claim 1, wherein the memory-access instruction is one of a read instruction and a write instruction.

11. An apparatus, comprising:

one or more data buffers configured to support non-horizontally sequential access of data contained therein, wherein the apparatus is configured to perform a sequence of operations, comprising:

detecting, in response to a memory-access request, a buffer hit/miss of data requested by the memory-access request within the one or more data buffers, when a buffer miss is detected, loading a block of data into a data buffer of the one or more data buffers selected according to the memory-access request, the block of data containing the data requested by the memory-access request, and performing non-horizontally sequential access of the data requested by the memory-access request from the selected data buffer.

12. The apparatus of claim 11, wherein the operation of detecting a buffer hit/buffer further comprises:

determining a target address indicated by the memory-access request as corresponding to the data requested by the memory-access request;

masking the target address to form a masked target address;

when the masked target address matches a tag address, detecting a buffer hit; and otherwise, detecting a buffer miss.

13. The apparatus of claim 11, wherein the operation of loading the block of data further comprises:

issuing a data request to one or more second data buffers for the data requested by the memory-access request;

receiving the block of data containing the data requested by the memory-access request; and loading the received data block within a corresponding portion of the selected data buffer according to the memory-access request.

14. The apparatus of claim 13, wherein the operation of issuing the data request further comprises:

detecting, in accordance with the data request, a buffer hit/buffer miss of the data requested by the memory-access instruction within the one or more second memory buffers;

when a buffer miss is detected, requesting from an external memory, a block of data containing the data requested by the memory-access instruction;

once the block of data is received, loading the block of data into the one or more second memory buffers;

otherwise, selecting the block of data containing the data requested by the memory-access instruction from a second memory buffer of the one or more second memory buffers according to the memory-access instruction; and providing the data block containing the data requested by the memory-access instruction to the selected data buffer.

15. The apparatus of claim 13, wherein the operation of loading the data request further comprises:

determining a block size of the data block according to the memory-access instruction;

requesting the data block from the one or more second data buffers according to the determined block size;

receiving the data block from a second memory buffer of the one or more second memory buffers; and storing the data into a corresponding portion of the selected data buffer according to the memory-access instruction.

16. The apparatus of claim 11, wherein the operation of performing the non-horizontally sequential access further comprises:

determining a data type indicated by the memory-access request as one of a byte and a byte multiple;

determining a block depth indicated by the memory-access request;

reading data portions, corresponding to the determined data type and according to the determined block depth, from the selected data buffer; and loading each read data portion into a destination data storage device according to the memory-access request.

17. The apparatus of claim 11, wherein the operation of performing the non-horizontally sequential access further comprises:

performing a vertical read of data requested by the memory-access request from the selected data buffer; and loading the vertically read data from the first memory buffer into a destination data storage device according to the memory-access request.

18. The apparatus of claim 11, further comprising:
one or more parallel write ports;
one or more read ports; an
one or more memory transpose circuitries to perform non-horizontally sequential access of the data requested by the memory-access request from a selected data buffer.

19. A system, comprising:
a first memory buffer, coupled to the execution unit via a bus, the first memory buffer configured to non-horizontally sequential access of data contained therein, and
one or more second memory buffers coupled to the execution unit via the bus to load data into the first memory buffer when a buffer miss is detected in response to a memory-access request from the execution unit.

20. The system of claim 19, further comprising:
one or more co-execution units coupled to the execution unit via a system bus.

21. The system of claim 19, wherein the first memory buffer further comprises:
one or more byte-multiple data buffers configured to support non-horizontally sequential access of byte-multiple data contained therein.

22. The system of claim 19, wherein the first memory buffer is configured to perform a sequence of operations, comprising:
detecting, in response to a memory-access request from the execution unit, a buffer hit/miss of data requested by the memory-access request within the first memory buffer,
when a buffer miss is detected, loading a block of data from the second memory buffers into the first memory buffer according to the memory-access request, the block of data containing the data requested by the memory-access request, and
performing a non-horizontally sequential access of the data requested by the memory-access request from the first memory buffer.

23. The system of claim 22, wherein the operation of performing the non-horizontally sequential access further comprises:
performing a vertical read of data requested by the memory-access request from the first memory buffer; and
loading the vertically read data from the first memory buffer into a destination data storage device according to the memory-access request.

24. The system of claim 19, wherein the first memory buffer maintains coherence of the data among the first memory buffer and the second memory buffers.

25. The system of claim 19, wherein the system is fabricated onto a printed wiring board on which a parallel bus is formed, an integrated circuit (IC) chip package being operatively installed on the board to communicate using the parallel bus, the package having an IC chip that includes the processor and an I/O section as an interface between the processor and the bus, such that the processor performs non-horizontally sequential access of data within the first memory buffer.

26. The system of claim 25, wherein the processor further comprises:
an execution unit coupled to the first memory buffer; and
one or more second memory buffers coupled to the processor.

27. The system of claim 25, wherein the IC chip further comprises:
a co-processor coupled to the parallel bus, including one or more external memory buffers.

28. A computer readable storage medium including program instructions that direct computer to function in a specified manner when executed by a processor, the program instructions comprising:
performing, in response to a memory-access instruction, non-horizontally sequential access of data requested by the memory-access instruction from a memory buffer, wherein performing the non-horizontally sequential access further comprises:
performing a vertical read of data requested by the memory-access instruction from the memory buffer; and
loading the data read from the memory buffer within a destination data storage device according to the memory-access instruction.

29. The computer readable storage medium of claim 28, wherein the memory-access instruction is one of a read instruction and a write instruction.

30. A method comprising:
detecting, in response to a memory-access instruction, a buffer hit/miss of data requested by the memory-access instruction within a first memory buffer;
when a buffer miss is detected, loading a block of data into the first memory buffer according to the memory-access instruction, the block of data containing the data requested by the memory-access instruction; and
performing vertically sequential access of the data requested by the memory-access instruction from the first memory buffer.

31. An apparatus, comprising:
one or more data buffers configured to support non-horizontally sequential access of data contained therein,
wherein the apparatus is configured to perform a sequence of operations, comprising:
detecting, in response to a memory-access request, a buffer hit/miss of data requested by the memory-access request within the one or more data buffers,
when a buffer miss is detected, loading a block of data into a data buffer of the one or more data buffers selected according to the memory-access request, the block of data containing the data requested by the memory-access request, and
performing vertically sequential access of the data requested by the memory-access request from the selected data buffer.

32. An apparatus comprising:
one or more byte-multiple data buffers, such that the byte-multiple data buffers support non-horizontally sequential access of corresponding byte-multiple data contained therein.
wherein the apparatus is configured to perform a sequence of operations, comprising:
detecting, in response to a memory-access request, a buffer hit/miss of data requested by the memory-access request within the one or more data buffers, when a buffer miss is detected, loading a block of data into a data buffer of the one or more data buffers selected according to the memory-access request, the block of data containing the data requested by the memory-access request, and performing non-horizontally sequential access of the data requested by the memory-access request from the selected data buffer.

33. An apparatus, comprising:

one or more data buffers configured to support non-horizontally sequential access of data contained therein; and one or more data shufflers to perform non-horizontally sequential access of the data requested by the memory-access request from a selected data buffer, wherein the apparatus is configured to perform a sequence of operations, comprising:

detecting, in response to a memory-access request, a buffer hit/miss of data requested by the memory-access request within the one or more data buffers, when a buffer miss is detected, loading a block of data into a data buffer of the one or more data buffers selected according to the memory-access request, the block of data containing the data requested by the memory-access request, and performing non-horizontally sequential access of the data requested by the memory-access request from the selected data buffer.

* * * * *

UNITED STATES PATENT AND TRADEMARK OFFICE
CERTIFICATE OF CORRECTION

| | |
|---|---|
| PATENT NO. | : 6,957,317 B2 |
| APPLICATION NO. | : 10/268186 |
| DATED | : October 18, 2005 |
| INVENTOR(S) | : Chen et al. |

Page 1 of 1

It is certified that error appears in the above-identified patent and that said Letters Patent is hereby corrected as shown below:

In column 23, at line 3, delete "an" and insert --and--.

In column 23, at line 10, after "to", insert --enable--.

Signed and Sealed this

Third Day of March, 2009

JOHN DOLL
*Acting Director of the United States Patent and Trademark Office*